United States Patent
Winig et al.

(10) Patent No.: US 10,516,992 B2
(45) Date of Patent: Dec. 24, 2019

(54) COMMERCIAL SATELLITE OPERATIONS WITH SECURE ENCLAVE FOR PAYLOAD OPERATIONS

(71) Applicant: The Boeing Company, Chicago, IL (US)

(72) Inventors: Robert J. Winig, Rancho Palos Verdes, CA (US); Yi-Feng James Chen, Irvine, CA (US)

(73) Assignee: The Boeing Company, Chicago, IL (US)

(*) Notice: Subject to any disclaimer, the term of this patent is extended or adjusted under 35 U.S.C. 154(b) by 150 days.

(21) Appl. No.: 15/724,125

(22) Filed: Oct. 3, 2017

(65) Prior Publication Data

US 2018/0255455 A1    Sep. 6, 2018

Related U.S. Application Data

(63) Continuation-in-part of application No. 15/451,291, filed on Mar. 6, 2017, and a continuation-in-part of
(Continued)

(51) Int. Cl.
*H04K 1/00* (2006.01)
*H04W 12/02* (2009.01)
(Continued)

(52) U.S. Cl.
CPC ........ *H04W 12/02* (2013.01); *H04B 7/18513* (2013.01); *H04B 7/18515* (2013.01);
(Continued)

(58) Field of Classification Search
CPC ............... H04W 12/02; H04B 7/18513; H04B 7/18582; H04B 7/18515; H04B 7/18593;
(Continued)

(56) References Cited

U.S. PATENT DOCUMENTS 5,701,603 A    12/1997  Norimatsu
7,542,716 B2   6/2009   Bell et al.
(Continued)

FOREIGN PATENT DOCUMENTS

EP    1085680    3/2001
EP    1936833    6/2008
(Continued)

OTHER PUBLICATIONS

Halimi et al., "Applicability of Asymmetric Cryptography for Space Data Links Security Systems", 2016 IEEE Aerospace Conference, Mar. 5, 2016, pp. 1-13, IEEE.
(Continued)

*Primary Examiner* — Mohammad W Reza
(74) *Attorney, Agent, or Firm* — Haynes and Boone LLP

(57) ABSTRACT

Systems, methods, and apparatus for commercial satellite operations with secure enclave for payload operations are disclosed. In one or more embodiments, the disclosed method comprises generating, by a secure enclave of a host satellite operation center (SOC), hosted commands according to service specifications for at least one hosted user. The method further comprises generating, by a SOC operation portion of the host SOC, host commands according to service specifications for a host user. Also, the method comprises transmitting, by the host SOC, the host commands and the hosted commands to a vehicle. In addition, the method comprises reconfiguring a host/hosted payload on the vehicle according to the host commands and the hosted commands. Additionally, the method comprises generating, by the host/hosted payload, host telemetry and hosted telemetry. Also, the method comprises transmitting, by the vehicle, the host telemetry and the hosted telemetry to the host SOC.

18 Claims, 11 Drawing Sheets

Related U.S. Application Data application No. 15/451,277, filed on Mar. 6, 2017, and a continuation-in-part of application No. 15/451,267, filed on Mar. 6, 2017, and a continuation-in-part of application No. 15/451,242, filed on Mar. 6, 2017, and a continuation-in-part of application No. 15/451,205, filed on Mar. 6, 2017, and a continuation-in-part of application No. 15/451,224, filed on Mar. 6, 2017, and a continuation-in-part of application No. 15/451,183, filed on Mar. 6, 2017, now Pat. No. 10,165,438.

(51) Int. Cl.
*H04L 29/06* (2006.01)
*H04B 7/185* (2006.01)
*H04Q 9/00* (2006.01)

(52) U.S. Cl.
CPC ..... *H04B 7/18582* (2013.01); *H04B 7/18593* (2013.01); *H04L 63/0428* (2013.01); *H04Q 9/00* (2013.01); *H04L 63/0272* (2013.01); *H04L 2209/80* (2013.01); *H04L 2209/84* (2013.01); *H04Q 2209/40* (2013.01)

(58) Field of Classification Search
CPC .. H04Q 9/00; H04Q 2209/40; H04L 63/0428; H04L 63/0272; H04L 2209/84; H04L 2209/80
See application file for complete search history.

(56) References Cited

U.S. PATENT DOCUMENTS

| | | | |
|---|---|---|---|
| 8,200,149 B1 | 6/2012 | Chen | |
| 8,521,427 B1 | 8/2013 | Luyks | |
| 8,614,945 B2 | 12/2013 | Brunnenmeyer | |
| 8,873,456 B2 | 10/2014 | Krikorian et al. | |
| 9,042,295 B1 | 5/2015 | Balter et al. | |
| 9,337,918 B2 | 5/2016 | Bell et al. | |
| 2002/0104920 A1 | 8/2002 | Thompson et al. | |
| 2003/0017827 A1 | 1/2003 | Ciaburro et al. | |
| 2007/0133528 A1 | 6/2007 | Jin et al. | |
| 2008/0055151 A1 | 3/2008 | Hudson et al. | |
| 2008/0149776 A1 | 6/2008 | Benedict | |
| 2008/0153414 A1 | 6/2008 | Ho et al. | |
| 2009/0052369 A1 | 2/2009 | Atkinson et al. | |
| 2013/0046422 A1 | 2/2013 | Cabos | |
| 2013/0077788 A1 | 3/2013 | Blanchard et al. | |
| 2013/0137365 A1 | 5/2013 | Taylor | |
| 2014/0099986 A1 | 4/2014 | Kikuchi et al. | |
| 2014/0119385 A1 | 5/2014 | Hoffmeyer et al. | |
| 2014/0303813 A1 | 10/2014 | Ihns | |
| 2015/0162955 A1 | 6/2015 | Burch | |
| 2015/0203213 A1 | 7/2015 | Levien et al. | |
| 2016/0087713 A1 | 3/2016 | Oderman et al. | |
| 2017/0012697 A1 | 1/2017 | Gong et al. | |
| 2017/0041065 A1 | 2/2017 | Goettle, Jr. et al. | |
| 2017/0134103 A1 | 5/2017 | Tessandori et al. | |
| 2018/0254822 A1 | 9/2018 | Miller et al. | |
| 2018/0254823 A1 | 9/2018 | Miller et al. | |
| 2018/0254866 A1 | 9/2018 | Chen et al. | |
| 2018/0255024 A1 | 9/2018 | Chen et al. | |
| 2018/0255025 A1 | 9/2018 | Chen et al. | |
| 2018/0255026 A1 | 9/2018 | Winig et al. | |
| 2018/0255027 A1 | 9/2018 | Winig et al. | |
| 2019/0082319 A1 | 3/2019 | Chen et al. | |

FOREIGN PATENT DOCUMENTS

| | | |
|---|---|---|
| EP | 2573956 | 3/2013 |
| JP | 2000166046 | 6/2000 |
| WO | WO 1996/032568 | 10/1996 |
| WO | WO 1999/040693 | 8/1999 |
| WO | WO 2013/130812 | 9/2013 |

OTHER PUBLICATIONS

Pang et al., "CHIRP Program Lessons Learned From the Contractor Program Management Team Perspective", 2012 IEEE Aerospace Conference, Mar. 3, 2012, pp. 1-7, XP032230091, DOI: 10.1109/AERO.2012.6187278, ISBN: 978-1-4577-0556-4, IEEE.

Summary of Configurations

| Payload | No. | Host CMD | Host TLM | Hosted CMD | Hosted TLM |
|---|---|---|---|---|---|
| Host / Hosted payload -OR- Host Payload and Hosted Payload | 1 | Outband | Outband | Outband | Outband |
| | 2 | Outband | Outband | Outband | Inband |
| | 3 | Outband | Outband | Inband | Outband |
| | 4 | Outband | Outband | Inband | Inband |
| | 5 | Outband | Inband | Outband | Outband |
| | 6 | Outband | Inband | Outband | Inband |
| | 7 | Outband | Inband | Inband | Outband |
| | 8 | Outband | Inband | Inband | Inband |
| | 9 | Inband | Outband | Outband | Outband |
| | 10 | Inband | Outband | Outband | Inband |
| | 11 | Inband | Outband | Inband | Outband |
| | 12 | Inband | Outband | Inband | Inband |
| | 13 | Inband | Inband | Outband | Outband |
| | 14 | Inband | Inband | Outband | Inband |
| | 15 | Inband | Inband | Inband | Outband |
| | 16 | Inband | Inband | Inband | Inband |

FIG. 8

COMMERCIAL SATELLITE OPERATIONS WITH SECURE ENCLAVE FOR PAYLOAD OPERATIONS

CROSS-REFERENCE TO RELATED APPLICATIONS

This application is a Continuation-in-Part application of, and claims priority to and the benefit of, (1) U.S. patent application Ser. No. 15/451,291, filed Mar. 6, 2017; (2) U.S. patent application Ser. No. 15/451,277, filed Mar. 6, 2017; (3) U.S. patent application Ser. No. 15/451,267, filed Mar. 6, 2017; (4) U.S. patent application Ser. No. 15/451,242, filed Mar. 6, 2017; (5) U.S. patent application Ser. No. 15/451,205, filed Mar. 6, 2017; (6) U.S. patent application Ser. No. 15/451,224, filed Mar. 6, 2017; and (7) U.S. patent application Ser. No. 15/451,183, filed Mar. 6, 2017; the entire disclosures of which are all expressly incorporated by reference herein.

FIELD

The present disclosure relates to payload operations. In particular, it relates to commercial satellite operations with secure enclave for payload operations.

BACKGROUND

Currently, typical payload operations for a vehicle (e.g., a satellite) have the ability to perform switching of inputs to outputs of the payload on the vehicle. All of this switching on the payload is commanded and controlled by a single satellite controller with no resource allocation privacy.

As such, there is a need for an improved payload operations design that allows for privacy in the allocation of resources on the payload.

SUMMARY

The present disclosure relates to a method, system, and apparatus for commercial satellite operations with secure enclave for payload operations. In one or more embodiments, a method for payload operations comprises receiving, by a secure enclave of a host satellite operation center (SOC), at least one request from at least one hosted user, where each of the requests comprises service specifications for the hosted user associated with the request. The method further comprises generating, by the secure enclave, unencrypted hosted commands for each of the requests according to the service specifications of the request. Also, the method comprises encrypting, by the secure enclave, the unencrypted hosted commands for each of the requests by utilizing a respective hosted communication security (COMSEC) variety for the hosted user associated with the request to produce encrypted hosted commands. In addition, the method comprises encrypting, by a SOC operation portion of the host SOC, unencrypted host commands by utilizing a host COMSEC variety to produce encrypted host commands. Additionally, the method comprises transmitting, by the host SOC, the encrypted host commands and the encrypted hosted commands to a vehicle.

Also, the method comprises decrypting, by a host communication security module on the vehicle, the encrypted host commands by utilizing the host COMSEC variety to produce the unencrypted host commands. In addition, the method comprises decrypting, by a respective hosted communication security module on the vehicle for each of the hosted users, the encrypted hosted commands for each of the hosted users by utilizing the respective hosted COMSEC variety to produce the unencrypted hosted commands. Additionally, the method comprises reconfiguring a host/hosted payload on the vehicle according to the unencrypted host commands and the unencrypted hosted commands.

In addition, the method comprises generating, by the host/hosted payload, unencrypted host telemetry and unencrypted hosted telemetry. Also, the method comprises encrypting, by the host communication security module, the unencrypted host telemetry by utilizing the host COMSEC variety to produce encrypted host telemetry. Also, the method comprises encrypting, by the respective hosted communication security module for each of the hosted users, the unencrypted hosted telemetry for each of the hosted users by utilizing the respective hosted COMSEC variety to produce the encrypted hosted telemetry. In addition, the method comprises transmitting, by the vehicle, the encrypted host telemetry and the encrypted hosted telemetry to the host SOC.

Additionally, the method comprises decrypting, by the SOC operation portion, the encrypted host telemetry by utilizing the host COMSEC variety to produce the unencrypted host telemetry. Further, the method comprises decrypting, by the secure enclave, the encrypted hosted telemetry for each of the hosted users by utilizing the respective hosted COMSEC variety to produce the unencrypted hosted telemetry for each of the hosted users.

In one or more embodiments, the method further comprises generating, by the SOC operation portion, the unencrypted host commands according to service specifications for a host user.

In at least one embodiment, the method further comprises transmitting, by a payload antenna on the vehicle, host user data to a host user antenna and hosted user data to a hosted user antenna.

In one or more embodiments, the encrypted host commands are transmitted from the host SOC to the vehicle utilizing at least one out-of-band frequency band and/or at least one inband frequency band. In at least one embodiment, when the encrypted host commands are transmitted utilizing at least one out-of-band frequency band, the encrypted host commands are transmitted from the host SOC to the vehicle via a SOC antenna. In some embodiments, when the encrypted host commands are transmitted utilizing at least one inband frequency band, the encrypted host commands are transmitted from the host SOC to the vehicle via a host gateway antenna.

In at least one embodiment, the encrypted hosted commands are transmitted from the host SOC to the vehicle utilizing at least one out-of-band frequency band and/or at least one inband frequency band. In one or more embodiments, when the encrypted hosted commands are transmitted utilizing at least one out-of-band frequency band, the encrypted hosted commands are transmitted from the host SOC to the vehicle via a SOC antenna. In some embodiments, when the encrypted hosted commands are transmitted utilizing at least one inband frequency band, the encrypted hosted commands are transmitted from the host SOC to the vehicle via a host gateway antenna.

In at least one embodiment, the encrypted host telemetry is transmitted from the vehicle to the host SOC utilizing at least one out-of-band frequency band and/or at least one inband frequency band. In some embodiments, when the encrypted host telemetry is transmitted utilizing at least one out-of-band frequency band, the encrypted host telemetry transmitted from the vehicle to the host SOC via a SOC antenna. In one or more embodiments, when the encrypted host telemetry is transmitted utilizing at least one inband frequency band, the encrypted host telemetry is transmitted from the vehicle to the host SOC via a host gateway antenna.

In at least one embodiment, the encrypted hosted telemetry is transmitted from the vehicle to the host SOC utilizing at least one out-of-band frequency band and/or at least one inband frequency band. In one or more embodiments, when the encrypted hosted telemetry is transmitted utilizing at least one out-of-band frequency band, the encrypted hosted telemetry transmitted from the vehicle to the host SOC via a SOC antenna. In some embodiments, when the encrypted hosted telemetry is transmitted utilizing at least one inband frequency band, the encrypted hosted telemetry is transmitted from the vehicle to the host SOC via a host gateway antenna.

In one or more embodiments, the host/hosted payload is a digital payload or an analog payload. In some embodiments, the reconfiguring of the host/hosted payload comprises adjusting transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one beam, transponder beamforming settings, effective isotropic radiation power (EIRP) for at least one beam, transponder channels, and/or beam steering.

In at least one embodiment, the reconfiguring of the host/hosted payload comprises reconfiguring a payload antenna, at least one analog-to-digital converter, at least one digital-to-analog converter, at least one beamformer, at least one digital channelizer, at least one demodulator, at least one modulator, at least one digital switch matrix, at least one digital combiner, and/or at least one analog switch matrix.

In one or more embodiments, the vehicle is a satellite, an aircraft, an unmanned aerial vehicle (UAV), or a space plane.

In at least one embodiment, a method for payload operations comprises receiving, by a secure enclave of a host satellite operation center (SOC), at least one request from at least one hosted user, where each of the requests comprises service specifications for the hosted user associated with the request. The method further comprises generating, by the secure enclave, unencrypted hosted commands for each of the requests according to the service specifications of the request. Also, the method comprises encrypting, by the secure enclave, the unencrypted hosted commands for each of the requests by utilizing a respective hosted communication security (COMSEC) variety for the hosted user associated with the request to produce encrypted hosted commands. In addition, the method comprises encrypting, by a SOC operation portion of the host SOC, unencrypted host commands by utilizing a host COMSEC variety to produce encrypted host commands. Also, the method comprises transmitting, by the host SOC, the encrypted host commands and the encrypted hosted commands to a vehicle.

In addition, the method comprises decrypting, by a host communication security module on the vehicle, the encrypted host commands by utilizing the host COMSEC variety to produce the unencrypted host commands. Additionally, the method comprises decrypting, by a respective hosted communication security module on the vehicle for each of the hosted users, the encrypted hosted commands for each of the hosted users by utilizing the respective hosted COMSEC variety to produce the unencrypted hosted commands. Also, the method comprises reconfiguring a host payload on the vehicle according to the unencrypted host commands. In addition, the method comprises commanding at least one hosted payload on the vehicle on or off according to the unencrypted hosted commands. Also, the method comprises reconfiguring at least one hosted payload according to the unencrypted hosted commands.

In addition, the method comprises generating, by the host payload, unencrypted host telemetry. Additionally, the method comprises generating, by at least one hosted payload, unencrypted hosted telemetry. Also, the method comprises encrypting, by the host communication security module, the unencrypted host telemetry by utilizing the host COMSEC variety to produce encrypted host telemetry. In addition, the method comprises encrypting, by the respective hosted communication security module for each of the hosted users, the unencrypted hosted telemetry for each of the hosted users by utilizing the respective hosted COMSEC variety to produce the encrypted hosted telemetry. Additionally, the method comprises transmitting, by the vehicle, the encrypted host telemetry and the encrypted hosted telemetry to the host SOC.

Also, the method comprises decrypting, by the SOC operation portion, the encrypted host telemetry by utilizing the host COMSEC variety to produce the unencrypted host telemetry. Further, the method comprises decrypting, by the secure enclave, the encrypted hosted telemetry for each of the hosted users by utilizing the respective hosted COMSEC variety to produce the unencrypted hosted telemetry for each of the hosted users.

In one or more embodiments, method further comprises generating, by the SOC operation portion, the unencrypted host commands according to service specifications for a host user.

In at least one embodiment, the method further comprises transmitting, by a host payload antenna on the vehicle, host user data to a host user antenna; and transmitting, by a hosted payload antenna on the vehicle, hosted user data to a hosted user antenna. In some embodiments, the host user antenna is a steerable reflector antenna or a phased array antenna, and the hosted user antenna is a steerable reflector antenna or a phased array antenna.

In one or more embodiments, the host payload is a digital payload or an analog payload, and at least one hosted payload is a digital payload or an analog payload.

In at least one embodiment, the reconfiguring of the host payload and/or at least one hosted payload comprises adjusting: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one beam, transponder beamforming settings, effective isotropic radiation power (EIRP) for at least one beam, transponder channels, and/or beam steering.

In one or more embodiments, the reconfiguring of the host payload and/or at least one hosted payload comprises reconfiguring: a host payload antenna, a hosted payload antenna, at least one analog-to-digital converter, at least one digital-to-analog converter, at least one beamformer, at least one digital channelizer, at least one demodulator, at least one modulator, at least one digital switch matrix, at least one digital combiner, and/or at least one analog switch matrix.

In at least one embodiment, a system for payload operations comprises at a secure enclave of a host satellite operation center (SOC) to receive at least one request from at least one hosted user, where each of the requests comprises service specifications for the hosted user associated with the request. The system further comprises the secure enclave to generate unencrypted hosted commands for each of the requests according to the service specifications of the request, and to encrypt the unencrypted hosted commands for each of the requests by utilizing a respective hosted communication security (COMSEC) variety for the hosted user associated with the request to produce encrypted hosted commands. Also, the system comprises a SOC operation portion of the host SOC to encrypt unencrypted host commands by utilizing a host COMSEC variety to produce encrypted host commands. In addition, the system comprises the host SOC to transmit the encrypted host commands and the encrypted hosted commands to a vehicle.

Also, the system comprises a host communication security module on the vehicle to decrypt the encrypted host commands by utilizing the host COMSEC variety to produce the unencrypted host commands. In addition, the system comprises a respective hosted communication security module on the vehicle for each of the hosted users to decrypt the encrypted hosted commands for each of the hosted users by utilizing the respective hosted COMSEC variety to produce the unencrypted hosted commands. Additionally, the system comprises a host/hosted payload on the vehicle configured to be reconfigured according to the unencrypted host commands and the unencrypted hosted commands, and to generate unencrypted host telemetry and unencrypted hosted telemetry.

In addition, the system comprises the host communication security module to encrypt the unencrypted host telemetry by utilizing the host COMSEC variety to produce encrypted host telemetry. Also, the system comprises the respective hosted communication security module for each of the hosted users to encrypt the unencrypted hosted telemetry for each of the hosted users by utilizing the respective hosted COMSEC variety to produce the encrypted hosted telemetry. Additionally, the system comprises the vehicle to transmit the encrypted host telemetry and the encrypted hosted telemetry to the host SOC.

Also, the system comprises the SOC operation portion to decrypt the encrypted host telemetry by utilizing the host COMSEC variety to produce the unencrypted host telemetry. Further, the system comprises the secure enclave to decrypt the encrypted hosted telemetry for each of the hosted users by utilizing the respective hosted COMSEC variety to produce the unencrypted hosted telemetry for each of the hosted users.

In one or more embodiments, a system for payload operations comprises a secure enclave of a host satellite operation center (SOC) to receive at least one request from at least one hosted user, where each of the requests comprises service specifications for the hosted user associated with the request. The system further comprises the secure enclave to generate unencrypted hosted commands for each of the requests according to the service specifications of the request, and to encrypt the unencrypted hosted commands for each of the requests by utilizing a respective hosted communication security (COMSEC) variety for the hosted user associated with the request to produce encrypted hosted commands. Also, the system comprises a SOC operation portion of the host SOC to encrypt unencrypted host commands by utilizing a host COMSEC variety to produce encrypted host commands. In addition, the system comprises the host SOC to transmit the encrypted host commands and the encrypted hosted commands to a vehicle.

Additionally, the system comprises a host communication security module on the vehicle to decrypt the encrypted host commands by utilizing the host COMSEC variety to produce the unencrypted host commands. Also, the system comprises a respective hosted communication security module on the vehicle for each of the hosted users to decrypt the encrypted hosted commands for each of the hosted users by utilizing the respective hosted COMSEC variety to produce the unencrypted hosted commands. In addition, the system comprises a host payload on the vehicle configured to be reconfigured according to the unencrypted host commands, and to generate unencrypted host telemetry. Additionally, the system comprises at least one hosted payload on the vehicle configured to be commanded on or off according to the unencrypted host commands, to be reconfigured according to the unencrypted hosted commands, and to generate unencrypted hosted telemetry.

Also, the system comprises the host communication security module to encrypt the unencrypted host telemetry by utilizing the host COMSEC variety to produce encrypted host telemetry. In addition, the system comprises the respective hosted communication security module for each of the hosted users to encrypt the unencrypted hosted telemetry for each of the hosted users by utilizing the respective hosted COMSEC variety to produce the encrypted hosted telemetry. Additionally, the system comprises the vehicle to transmit the encrypted host telemetry and the encrypted hosted telemetry to the host SOC.

In addition, the system comprises the SOC operation portion to decrypt the encrypted host telemetry by utilizing the host COMSEC variety to produce the unencrypted host telemetry. Further, the system comprises the secure enclave to decrypt the encrypted hosted telemetry for each of the hosted users by utilizing the respective hosted COMSEC variety to produce the unencrypted hosted telemetry for each of the hosted users.

In at least one embodiment, a method for payload operations comprises generating, by a secure enclave of a host satellite operation center (SOC), hosted commands according to service specifications for at least one hosted user. The method further comprises generating, by a SOC operation portion of the host SOC, host commands according to service specifications for a host user. Also, the method comprises transmitting, by the host SOC, the host commands and the hosted commands to a vehicle. In addition, the method comprises reconfiguring a host/hosted payload on the vehicle according to the host commands and the hosted commands. Additionally, the method comprises generating, by the host/hosted payload, host telemetry and hosted telemetry. Further, the method comprises transmitting, by the vehicle, the host telemetry and the hosted telemetry to the host SOC.

In one or more embodiments, a method for payload operations comprises generating, by a secure enclave of a host satellite operation center (SOC), hosted commands according to service specifications for at least one hosted user. The method further comprises generating, by a SOC operation portion of the host SOC, host commands according to service specifications for a host user. Also, the method comprises transmitting, by the host SOC, the host commands and the hosted commands to a vehicle. In addition, the method comprises reconfiguring a host payload on the vehicle according to the host commands. Additionally, the method comprises commanding at least one hosted payload on the vehicle on or off according to the host commands. Also, the method comprises reconfiguring at least one hosted payload according to the hosted commands. In addition, the method comprises generating, by the host payload, host telemetry. Also, the method comprises generating, by at least one hosted payload, hosted telemetry. Further, the method comprises transmitting, by the vehicle, the host telemetry and the hosted telemetry to the host SOC.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIG. 1 is a diagram showing the disclosed system for commercial satellite operations with secure enclave for payload operations; where (1) the vehicle employs a digital host/hosted payload, and (2) the host commanding, hosted commanding, host telemetry, and hosted telemetry are all transmitted out-of-band, in accordance with at least one embodiment of the present disclosure.

Figure 2:
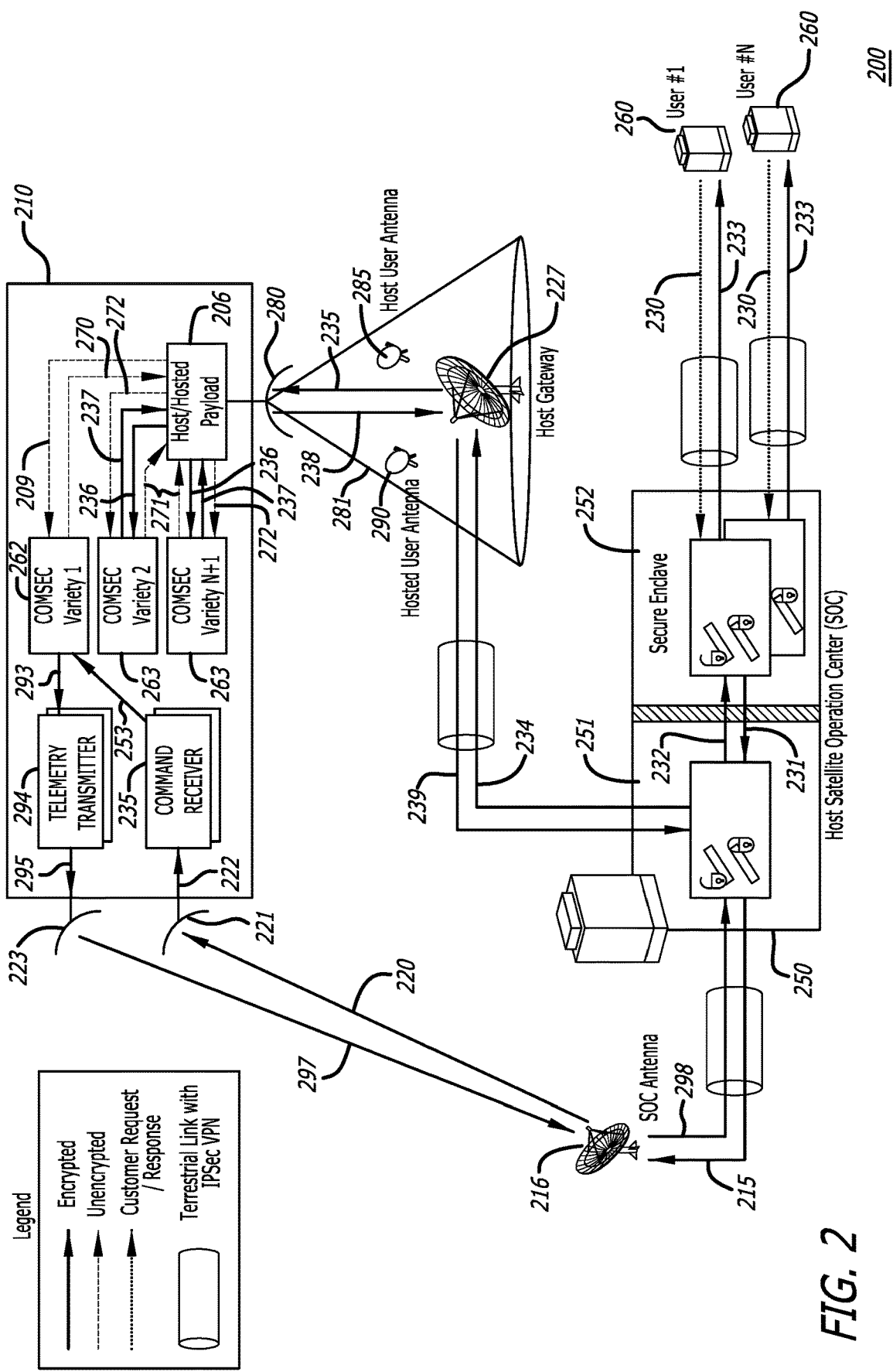

FIG. 2 is a diagram showing the disclosed system for commercial satellite operations with secure enclave for payload operations; where (1) the vehicle employs a digital host/hosted payload, and (2) the host commanding and host telemetry are transmitted out-of-band, and the hosted commanding and hosted telemetry are transmitted inband, in accordance with at least one embodiment of the present disclosure.

Figure 1:
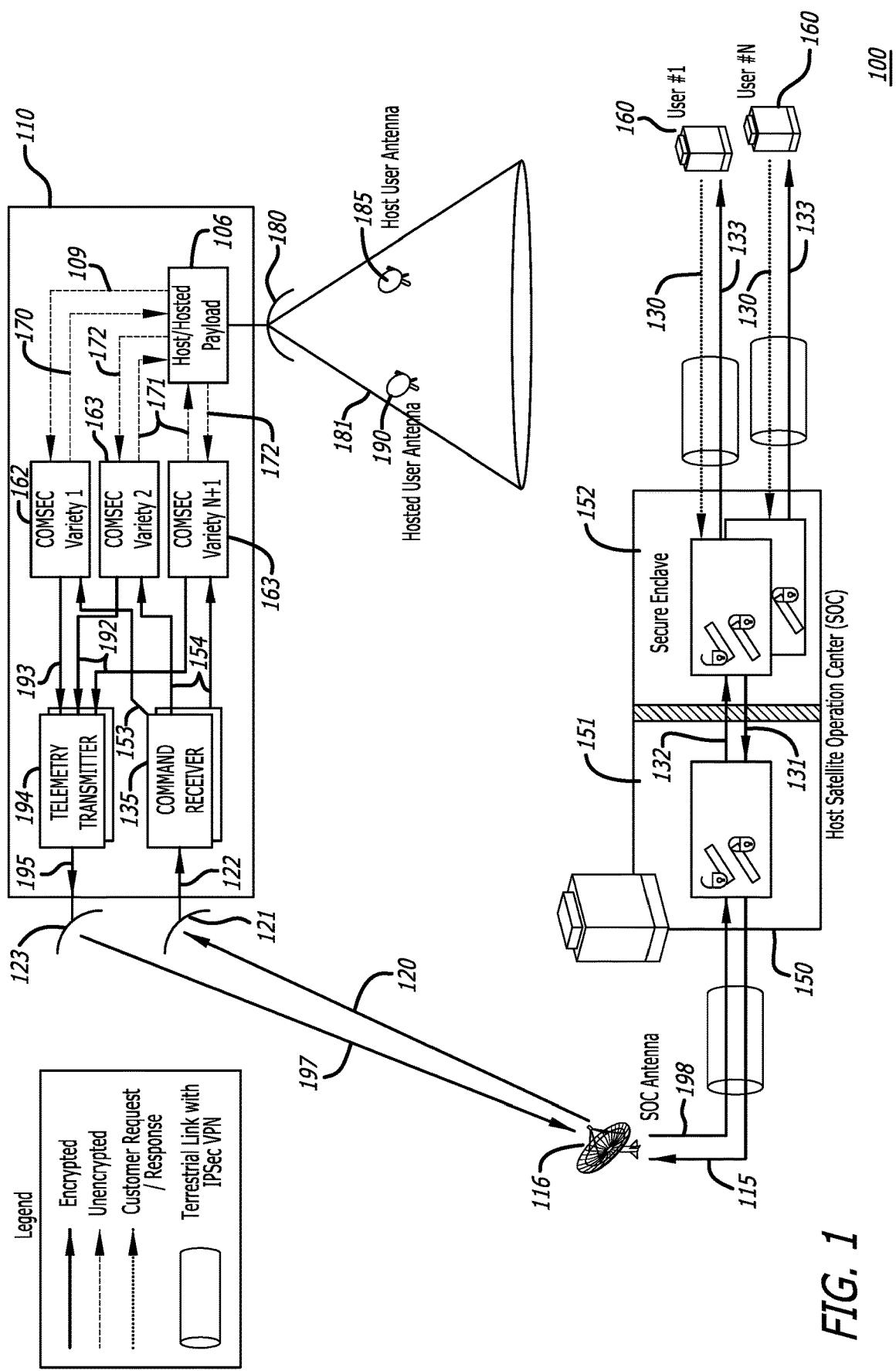
FIGS. 1-3B are related to systems, methods, and apparatus for commercial satellite operations with secure enclave for payload operations employing a vehicle with a single host/hosted payload.
Figure 3A:
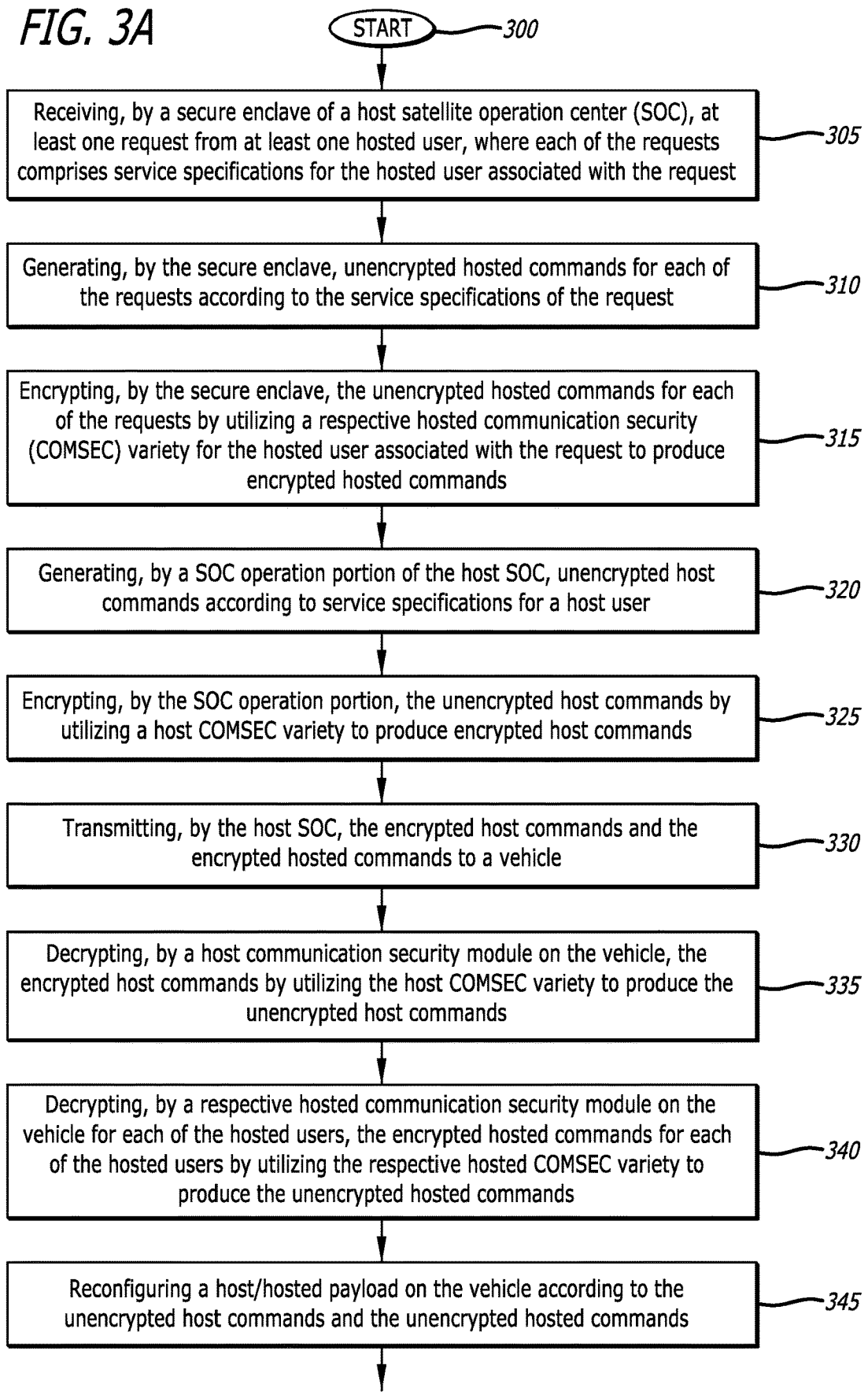
Figure 3B:
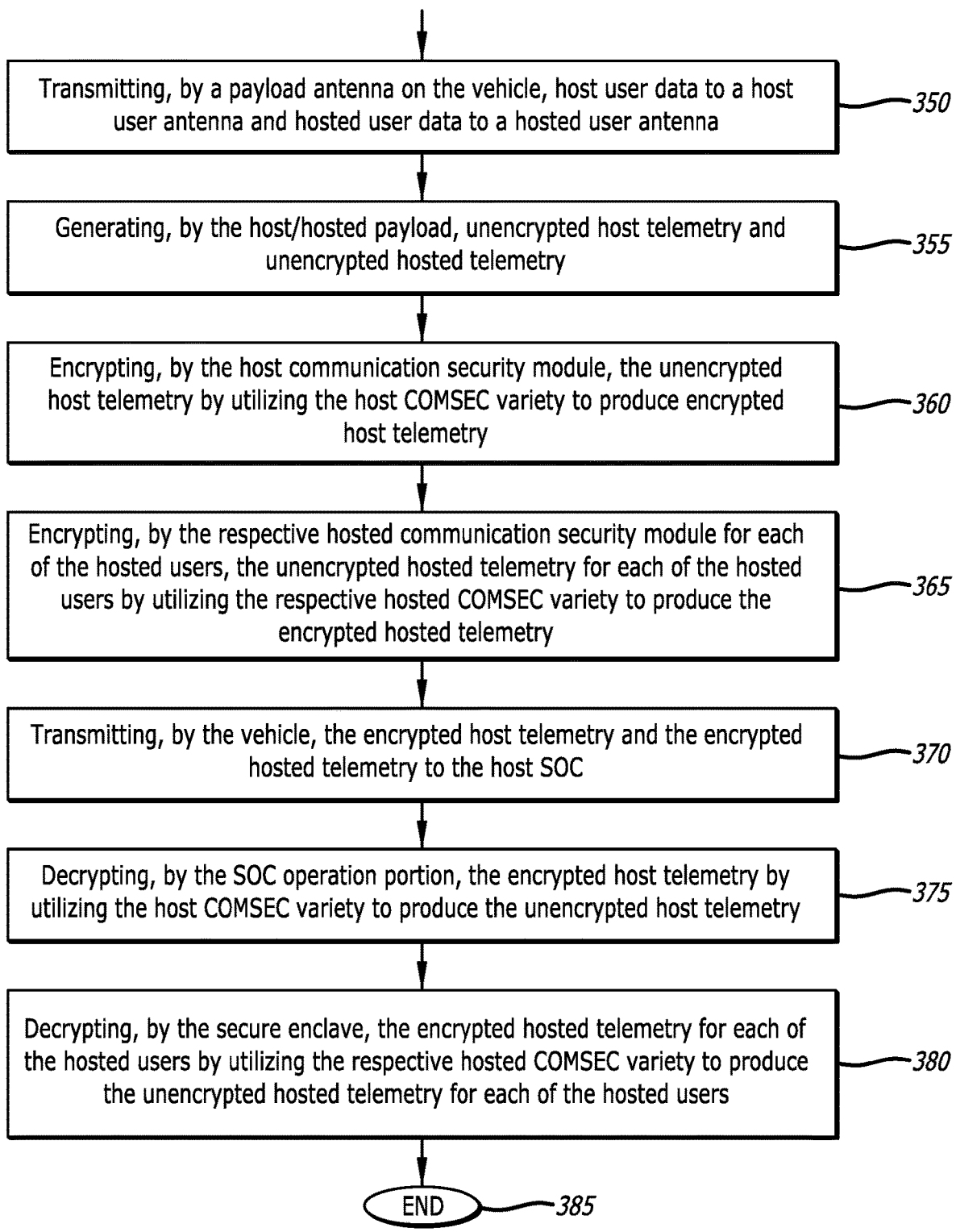

FIGS. 3A and 3B together show a flow chart for the disclosed method for commercial satellite operations with secure enclave for payload operations for the systems shown in FIGS. 1 and 2, in accordance with at least one embodiment of the present disclosure.

FIGS. 4-7C are related to systems, methods, and apparatus for commercial satellite operations with secure enclave for payload operations employing a vehicle with a host payload and at least one separate hosted payload.

Figure 4:
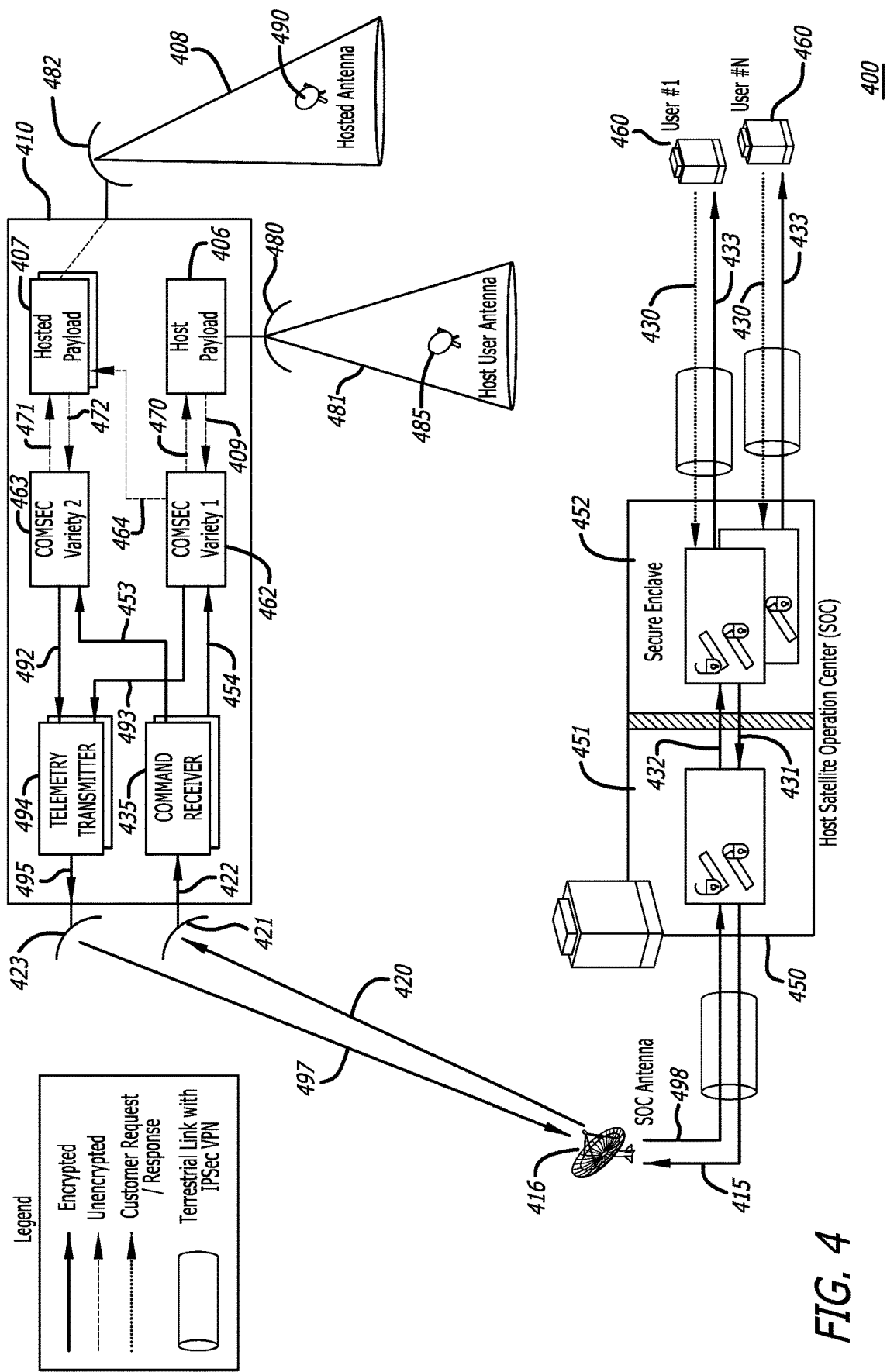

FIG. 4 is a diagram showing the disclosed system for commercial satellite operations with secure enclave for payload operations; where (1) the vehicle employs a digital host payload and at least one analog hosted payload, and (2) the host commanding, hosted commanding, host telemetry, and hosted telemetry are all transmitted out-of-band, in accordance with at least one embodiment of the present disclosure.

Figure 5:
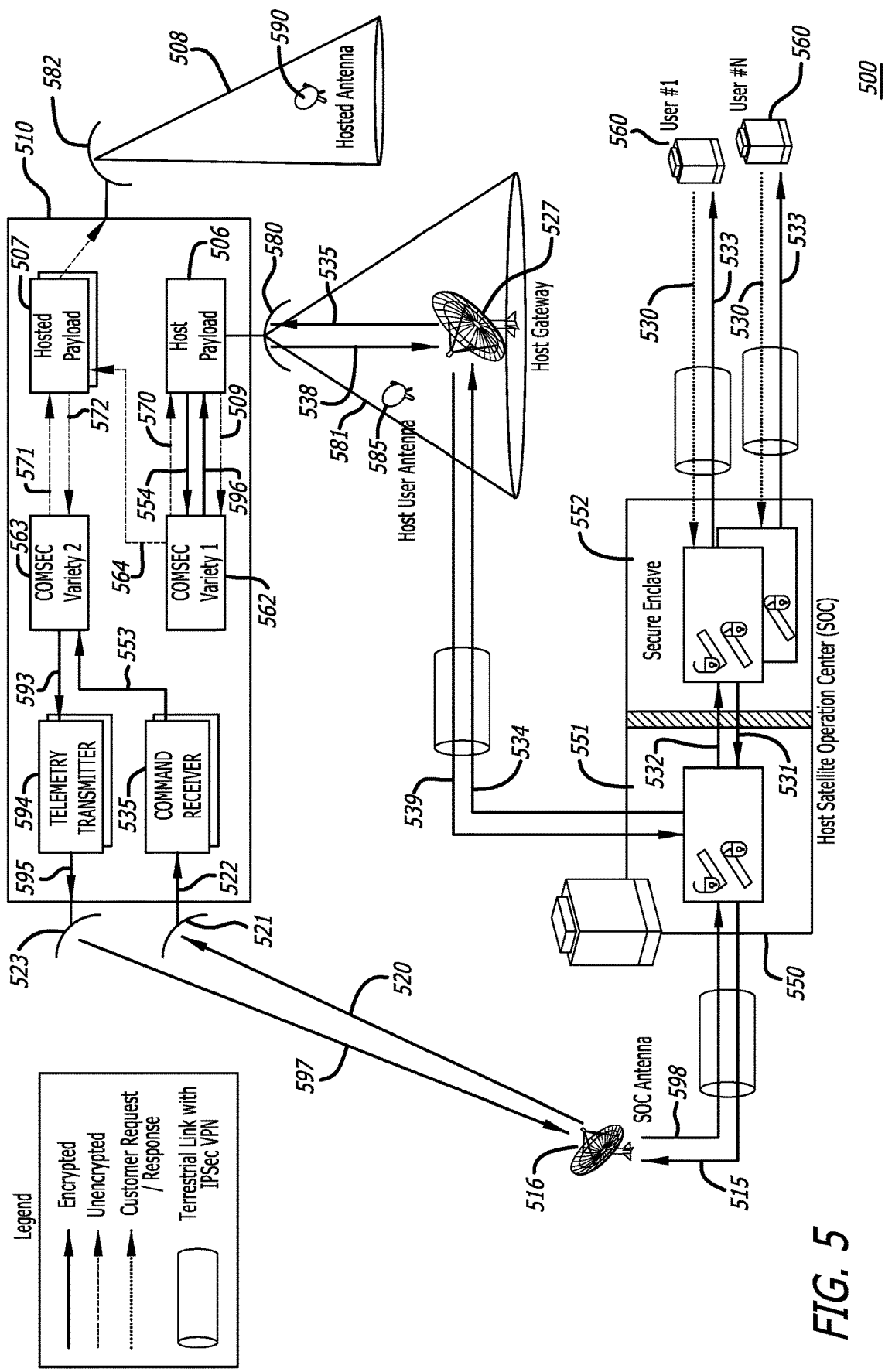

FIG. 5 is a diagram showing the disclosed system for commercial satellite operations with secure enclave for payload operations; where (1) the vehicle employs a digital host payload and at least one analog hosted payload, and (2) the hosted commanding and hosted telemetry are transmitted out-of-band, and the host commanding and host telemetry are transmitted inband, in accordance with at least one embodiment of the present disclosure.

Figure 6:
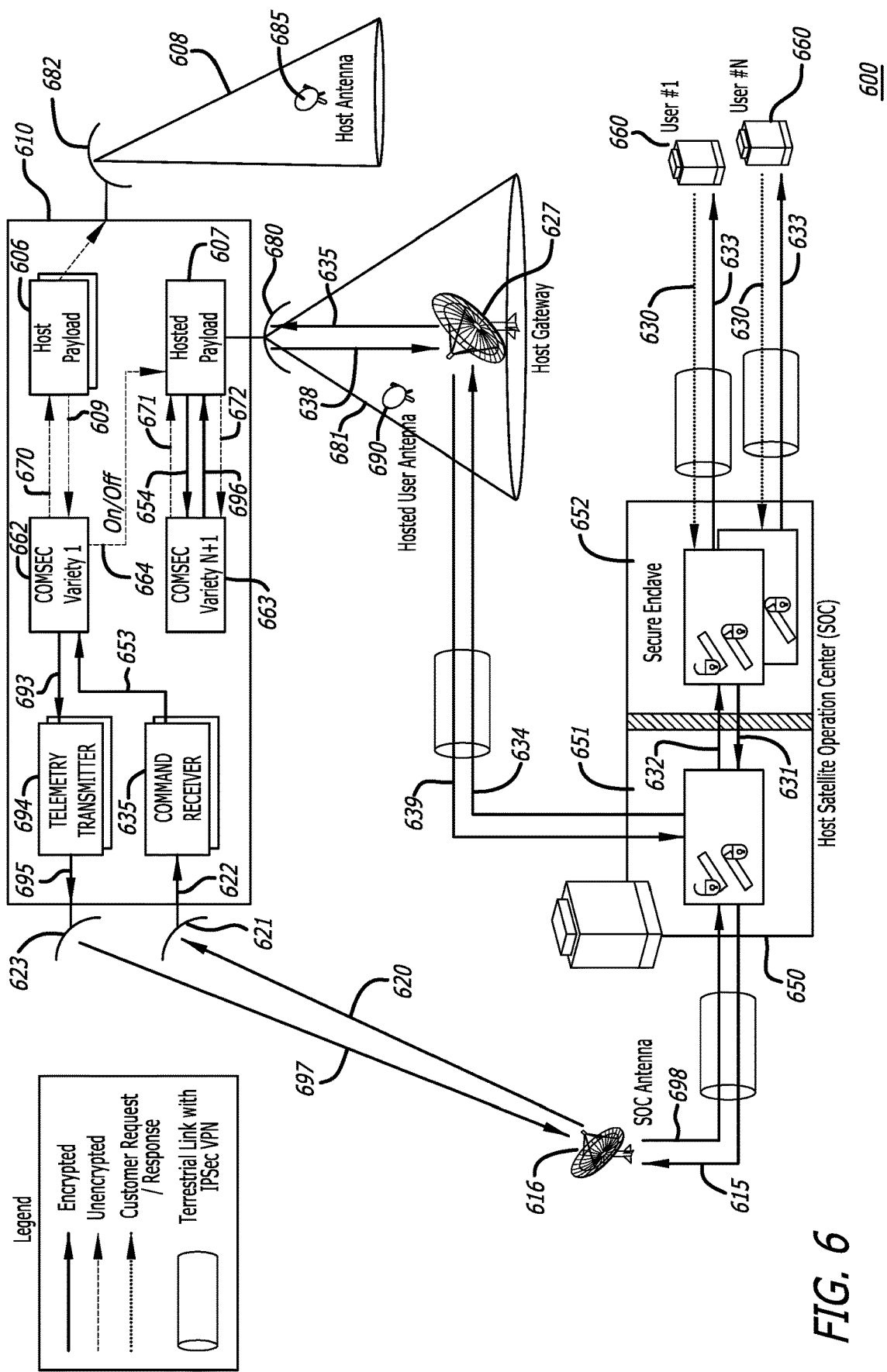

FIG. 6 is a diagram showing the disclosed system for commercial satellite operations with secure enclave for payload operations; where (1) the vehicle employs an analog host payload and at least one digital hosted payload, and (2) the host commanding and host telemetry are transmitted out-of-band, and the hosted commanding and hosted telemetry are transmitted inband, in accordance with at least one embodiment of the present disclosure.

Figure 7A:
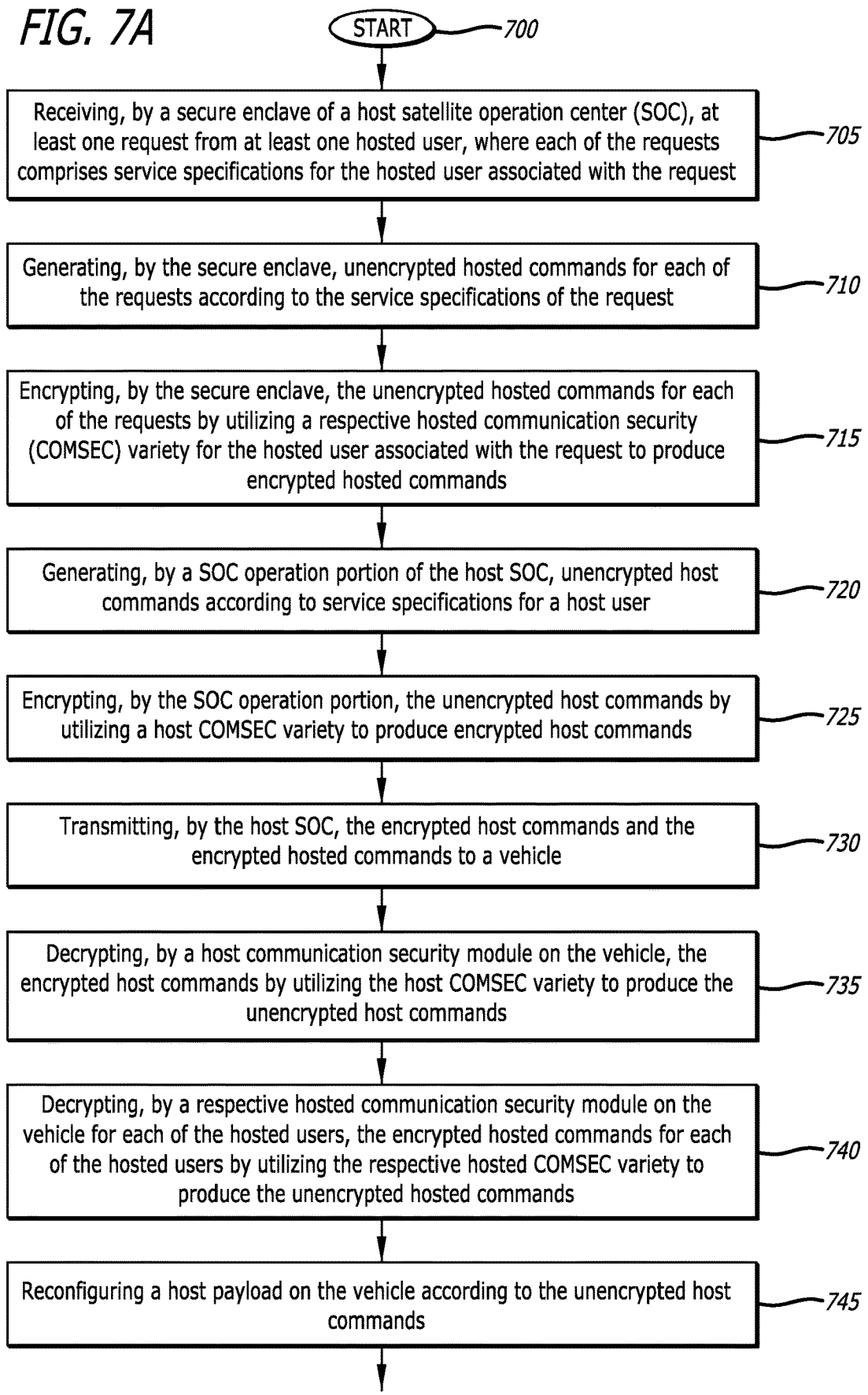
Figure 7B:
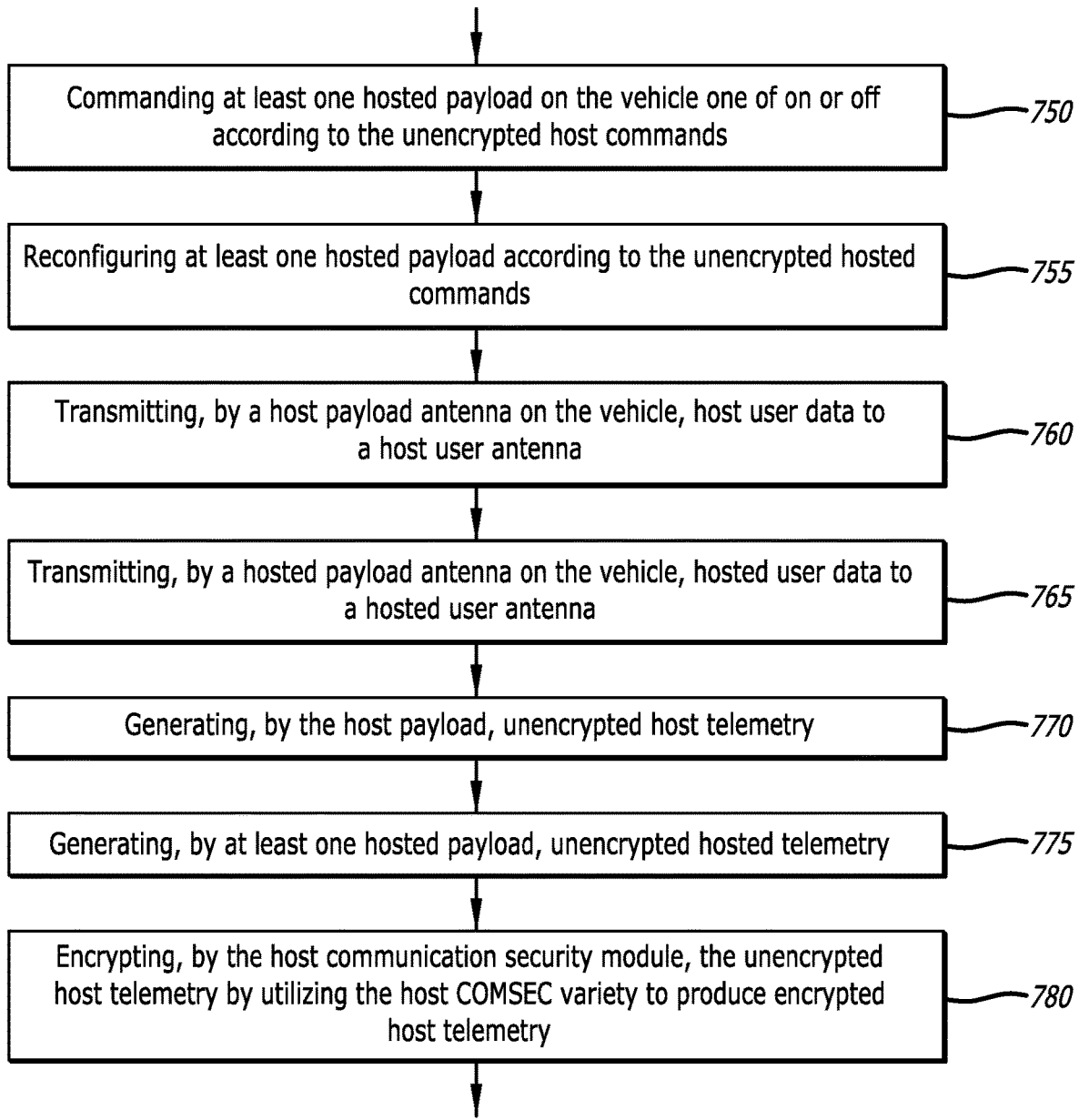
Figure 7C:
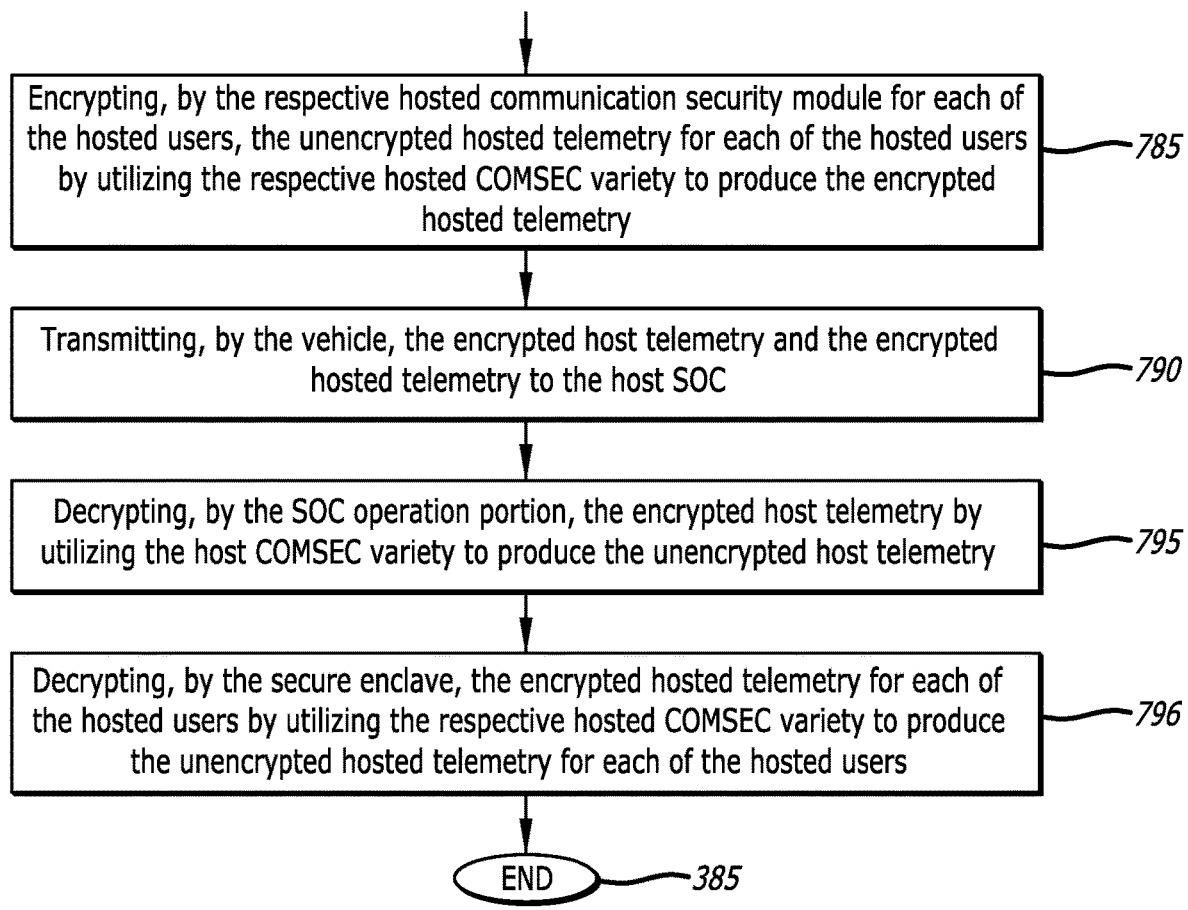

FIGS. 7A, 7B, and 7C together show a flow chart for the disclosed method for commercial satellite operations with secure enclave for payload operations for the systems shown in FIGS. 4, 5, and 6, in accordance with at least one embodiment of the present disclosure.

FIG. 8 is a spreadsheet showing the possible combinations for the transmission (i.e. transmitted either out-of-band or inband) of the host commanding, host telemetry, hosted commanding, and hosted telemetry for the disclosed system for commercial satellite operations with secure enclave for payload operations, in accordance with at least one embodiment of the present disclosure.

DESCRIPTION

The methods and apparatus disclosed herein provide an operative system for commercial satellite operations with secure enclave for payload operations. The system of the present disclosure allows for vehicle operators (e.g., host users) to privately share vehicle resources (e.g., a satellite payload(s)) with customers (e.g., hosted users). In particular, the disclosed system employs a host satellite operation center (SOC) that separates the data processing (e.g., the commanding and telemetry) of the host user and the hosted user(s) by utilizing a secure enclave and a SOC operation portion. The secure enclave portion is a secure portion of the host SOC that is utilized for the hosted user data processing, and allows for the hosted user(s) to maintain privacy of its data and operations from the host user. As such, the secure enclave provides full autonomous control of a portion of a shared payload (e.g., a host/hosted payload) or of at least one separate hosted payload installed on a satellite. The host SOC arrangement does not allow for the host user to have any knowledge of the commanding or telemetry of the portion of a shared payload (e.g., a host/hosted payload) used by the hosted user(s) or of at least one separate hosted payload installed on a satellite used by hosted user(s). The SOC operating portion is utilized for the host user data processing, which remains private from the host user.

As previously mentioned above, currently, typical payload operations for a vehicle (e.g., a satellite) have the ability to perform switching of inputs to outputs of the payload on the vehicle. All of this switching on the payload is commanded and controlled by a single satellite controller with no resource allocation privacy. The disclosed system allows for private vehicle resource allocation and control that provides vehicle users the ability to privately, dynamically, allocate resources (e.g., a host/hosted payload, a host payload and/or a hosted payload) on demand.

It should be noted that the host/hosted payload (i.e. shared payload), the host payload and/or at least one hosted payload for the disclosed system for private vehicle resource allocation and control may employ various different types of transponders. For example, various different types of transponders may be employed including, but not limited to, various different types of digital transponders, various different types of analog transponders (e.g., conventional repeater-type transponders), and various different types of combination analog/digital transponders.

In addition, it should be noted that in this disclosure, inband frequency band(s) refer to a frequency band(s) that is the same frequency band(s) utilized to transmit payload data (e.g., host payload data and/or hosted payload data); and out-of-band frequency band(s) refer to a frequency band(s) that is not the same frequency band(s) utilized to transmit payload data (e.g., host payload data). Additionally, it should be noted that in the disclosed system, all commanding and telemetry can be performed by any combination of inband frequency band(s) and out-of-band frequency bands(s). Refer to FIG. 8, which shows the possible combinations for the transmission (i.e. transmitted either out-of-band or inband) of the host commanding, host telemetry, hosted commanding, and hosted telemetry for the disclosed system.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the system described herein is merely one example embodiment of the present disclosure.

For the sake of brevity, conventional techniques and components related to satellite communication systems, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

FIGS. 1-3B are related to systems, methods, and apparatus for commercial satellite operations with secure enclave for payload operations employing a vehicle with a single host/hosted payload.

FIG. 1 is a diagram showing the disclosed system for commercial satellite operations with secure enclave for payload operations; where (1) the vehicle employs a digital host/hosted payload 106, and (2) the host commanding, hosted commanding, host telemetry, and hosted telemetry are all transmitted out-of-band, in accordance with at least one embodiment of the present disclosure. In this figure, a vehicle 110 and a host satellite operations center (SOC) 150 are shown. Various different types of vehicles may be employed for the vehicle 110 including, but not limited to, an airborne vehicle. And, various different types of airborne vehicles may be employed for the vehicle 110 including, but not limited to, a satellite, an aircraft, an unmanned aerial vehicle (UAV), and a space plane.

In the case of a satellite being employed for the vehicle 110, it should be noted that satellites typically include computer-controlled systems. A satellite generally includes a bus and a payload (e.g., a shared host/hosted payload 106). The bus may include systems (which include components) that control the satellite. These systems perform tasks, such as power generation and control, thermal control, telemetry, attitude control, orbit control, and other suitable operations.

The payload of the satellite provides functions to users of the satellite. The payload may include antennas, transponders, and other suitable devices. For example, with respect to communications, the payload in a satellite may be used to provide Internet access, telephone communications, radio, television, and/or other types of communications. Different entities may use the different portions of the shared payload 106 on the satellite. For example, a host user (e.g., an owner of the satellite) may utilize one portion of the host/hosted payload 106, and the host user may lease out different portions of the host/hosted payload 106 to hosted users (e.g., customers) to use.

Leasing a portion of a payload(s) (e.g., a hosted/hosted payload 106) to a customer(s) (e.g., a hosted user(s)) may increase the revenues that an owner (e.g., the host user) of a satellite can obtain. Further, a customer may use a subset of the total resources in a satellite for a cost that is less than the cost for the customer to purchase and operate a satellite, to build and operate a satellite, or to lease an entire satellite.

During operation, hosted users 160 (e.g., N number of hosted users 160) transmit 130 (via a terrestrial link with internet protocol security (IPSec) virtual private network (VPN)) requests to a secure enclave 152 of a host satellite operation center (SOC) 150, where each of the requests comprises service specifications for the hosted user associated with the request. The various different types of service specifications that may be transmitted include, but are not limited to, regions of antenna coverage, effective isotropic radiation power (EIRP) for the antenna coverage, and a time period of when the antenna coverage is to occur. For example, hosted user #1 160 may transmit 130 a request(s) comprising service specifications for specific regions on the Earth to receive antenna coverage (e.g., by specifying latitude and longitude coordinates, geocentric coordinates, and/or geodetic coordinates for the coverage region(s)), the lowest level of EIRP to be received for those regions for the antenna coverage, and a time period of when the antenna overage is to occur.

After the secure enclave 152 receives the requests, the secure enclave 152 generates unencrypted hosted commands for each of the requests according to the service specifications of the associated request. The hosted commands are commands that are used to configure each of the portions of the host/hosted payload 106 that are utilized by the hosted users 160. Then, the secure enclave 152 encrypts the unencrypted hosted commands for each of the requests by utilizing a respective hosted communication security (COMSEC) variety for the hosted user associated with the request to produce encrypted hosted commands. As such, for each hosted user 160, a different hosted COMSEC variety will be utilized for the encryption of the hosted commands associated with that hosted user 160. It follows that for N number of hosted users 106, N number of hosted COMSEC varieties will be utilized to encrypt the hosted commands. However, it should be noted that for the encryption of the hosted user commands, COMSEC variety 2 to COMSEC variety N+1 will be utilized. For example, hosted commands associated with a request(s) from hosted user #1 160 will be encrypted with COMSEC variety 2, hosted commands associated with a request(s) from hosted user #2 160 will be encrypted with COMSEC variety 3, hosted commands associated with a request(s) from hosted user #3 160 will be encrypted with COMSEC variety 4, . . . and hosted commands associated with a request(s) from hosted user #N 160 will be encrypted with COMSEC variety N+1. It should be noted that the hosted COMSEC varieties may each include at least one encryption key and/or at least one algorithm (e.g., a Type 1 encryption algorithm or a Type 2 encryption algorithm). Then, the secure enclave 152 transmits 131 the encrypted hosted commands to a satellite operation portion 151 of the host SOC 150.

The satellite operation portion 151 of the host SOC 150 generates unencrypted host commands according to service specifications for the host user. The host commands are commands that are used to configure the portion of the host/hosted payload 106 that is utilized by the host user. The various different types of service specifications that may be specified by the host user include, but are not limited to, regions of antenna coverage, effective isotropic radiation power (EIRP) for the antenna coverage, and a time period of when the antenna coverage is to occur. Then, the satellite operation portion 151 encrypts the unencrypted host commands by utilizing a host COMSEC variety (e.g., COMSEC variety 1) to produce encrypted host commands. It should be noted that the host COMSEC variety may include at least one encryption key and/or at least one algorithm (e.g., a Type 1 encryption algorithm or a Type 2 encryption algorithm).

The satellite operation portion 151 of the host SOC 150 then transmits 115 (via a terrestrial link with IPSec VPN) the encrypted host commands and the encrypted hosted commands to a ground SOC antenna 116. Then, the SOC antenna 116 transmits 120 the encrypted host commands and the encrypted hosted commands to a command antenna 121 on the vehicle 110. The SOC antenna 116 transmits 120 the encrypted host commands and the encrypted hosted commands utilizing an out-of-band frequency band(s) (i.e. a frequency band(s) that is not the same frequency band(s) utilized to transmit payload data). The command antenna 121 on the vehicle 110 then transmits 122 the encrypted host commands to a command receiver 135.

The command receiver 135 then transmits 153 the encrypted host commands to a host communication security module 162. The host communication security module 162 decrypts the encrypted host commands utilizing the host COMSEC variety (e.g., COMSEC variety 1) to generate the unencrypted host commands.

It should be noted that the host communication security module 162 may comprise one or more communication security modules (e.g., communication security module 1 and communication security module 2, where communication security module 2 is a redundant communication security module that is utilized when there is a failure of communication security module 1), where the extra communication security modules are redundant communication security modules that are utilized when there is a communication security module failure. In addition, the host communication security module 162 may comprise one or more processors.

The command receiver 135 also transmits 154 the encrypted hosted commands to hosted communication security modules 163. The hosted communication security modules 163 decrypt the encrypted hosted commands utilizing the hosted COMSEC varieties (e.g., COMSEC variety 2 to COMSEC variety N+1) to generate the unencrypted hosted commands.

It should be noted that the hosted communication security modules 163 may each comprise one or more communication security modules (e.g., communication security module 1 and communication security module 2, where communication security module 2 is a redundant communication security module that is utilized when there is a failure of communication security module 1), where the extra communication security modules are redundant communication security modules that are utilized when there is a communication security module failure. In addition, the host communication security modules 163 may each comprise one or more processors.

The host communication security module 162 then transmits 170 the unencrypted host commands to the host/hosted payload 106. Also, the hosted communication security modules 163 then transmit 171 the unencrypted hosted commands to the host/hosted payload 106. The host/hosted payload 106 is reconfigured according to the unencrypted host commands and the unencrypted hosted commands. The reconfiguring of the host/hosted payload 106 may comprise adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one beam, transponder beamforming settings, effective isotropic radiation power (EIRP) for at least one beam, transponder channels, or beam steering. Additionally, the reconfiguring of the host/hosted payload 106 may comprise reconfiguring at least one of: the payload antenna 180, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix. In one or more embodiments, the host/hosted payload comprises 106 one or more processors.

After the host/hosted payload 106 is reconfigured, a payload antenna 180 then transmits (e.g., in one or more antenna beams 181) host user data to a host user antenna 185 on the ground and hosted user data to a hosted user antenna 190 on the ground. It should be noted that in other embodiments, the host user antenna 185 and/or the hosted user antenna 190 may be airborne (e.g., located on an aircraft or satellite) or marine (e.g., located on a ship) rather than terrestrial (e.g., located on the ground) as is shown in FIG. 1.

Also, it should be noted that, although in FIG. 1, antenna beam 181 is shown to include a single circular spot beam; in other embodiments, the antenna beam 181 may include more than one beam as is shown in FIG. 1 (e.g., antenna beam 181 may include multiple beams, and antenna beam 181 may include beams of different shapes than the circular spot beam as is shown in FIG. 1 (e.g., antenna beam 181 may include elliptical beams and/or shaped beams of various different shapes).

It should be noted that in one or more embodiments, the payload antenna 180 may comprise one or more reflector dishes including, but not limited to, parabolic reflectors and/or shaped reflectors. In addition, the payload antenna 180 may comprise one or more multifeed antenna arrays.

The host/hosted payload 106 transmits 109 unencrypted host telemetry (i.e. telemetry data related to the portion of the host/hosted payload 106 that is utilized by the host user) to the host communication security module 162. The host communication security module 162 then encrypts the unencrypted host telemetry utilizing the host COMSEC variety (i.e. COMESEC variety 1) to generate encrypted host telemetry. Also, the host/hosted payload 106 transmits 172 unencrypted hosted telemetry (i.e. telemetry data related to the portions of the host/hosted payload 106 that are utilized by the hosted users) to the hosted communication security modules 163. The hosted communication security modules 163 then encrypt the unencrypted hosted telemetry utilizing the hosted COMSEC varieties (i.e. COMSEC variety 2 to COMSEC variety N+1) to generate encrypted hosted telemetry. As such, for each hosted user 160, a different hosted COMSEC variety will be utilized for the encryption of the unencrypted hosted telemetry associated with that hosted user 160.

The host communication security module 162 then transmits 193 the encrypted host telemetry to a telemetry transmitter 194. And, the hosted communication security modules 163 then transmit 192 the encrypted hosted telemetry to the telemetry transmitter 194. The telemetry transmitter 194 then transmits 195 the encrypted host telemetry and the encrypted hosted telemetry to a telemetry antenna 123. The telemetry antenna 123 then transmits 197 the encrypted host telemetry and the encrypted hosted telemetry to the SOC antenna 116. The SOC antenna 116 then transmits 198 (via a terrestrial link with IPSec VPN) the encrypted host telemetry and the encrypted hosted telemetry to the satellite operation portion 151 of the host SOC 150. The satellite operation portion 151 then decrypts the encrypted host telemetry utilizing the host COMSEC variety (i.e. COMSEC variety 1) to generate the unencrypted host telemetry.

The satellite operation portion 151 transmits 132 the encrypted hosted telemetry to the secure enclave 152 of the host SOC 150. The secure enclave 152 decrypts the encrypted hosted telemetry utilizing the hosted COMSEC varieties (e.g., COMSEC variety 2 to COMSEC variety N+1) to generate the unencrypted hosted telemetry. The secure enclave 152 then transmits 133 (via a terrestrial link with IPSec VPN) the unencrypted hosted telemetry respectively to the hosted users 160 that the unencrypted telemetry is associated.

FIG. 2 is a diagram showing the disclosed system for commercial satellite operations with secure enclave for payload operations; where (1) the vehicle employs a digital host/hosted payload 206, and (2) the host commanding and host telemetry are transmitted out-of-band, and the hosted commanding and hosted telemetry are transmitted inband, in accordance with at least one embodiment of the present disclosure. In this figure, a vehicle 210 and a host satellite operations center (SOC) 250 are shown. Various different types of vehicles may be employed for the vehicle 210 including, but not limited to, an airborne vehicle. And, various different types of airborne vehicles may be employed for the vehicle 210 including, but not limited to, a satellite, an aircraft, an unmanned aerial vehicle (UAV), and a space plane.

In the case of a satellite being employed for the vehicle 210, it should be noted that satellites typically include computer-controlled systems. A satellite generally includes a bus and a payload (e.g., a shared host/hosted payload 206). The bus may include systems (which include components) that control the satellite. These systems perform tasks, such as power generation and control, thermal control, telemetry, attitude control, orbit control, and other suitable operations.

The payload of the satellite provides functions to users of the satellite. The payload may include antennas, transponders, and other suitable devices. For example, with respect to communications, the payload in a satellite may be used to provide Internet access, telephone communications, radio, television, and/or other types of communications. Different entities may use the different portions of the shared payload 106 on the satellite. For example, a host user (e.g., an owner of the satellite) may utilize one portion of the host/hosted payload 206, and the host user may lease out different portions of the host/hosted payload 206 to hosted users (e.g., customers) to use.

Leasing a portion of a payload(s) (e.g., a hosted/hosted payload 206) to a customer(s) (e.g., a hosted user(s)) may increase the revenues that an owner (e.g., the host user) of a satellite can obtain. Further, a customer may use a subset of the total resources in a satellite for a cost that is less than the cost for the customer to purchase and operate a satellite, to build and operate a satellite, or to lease an entire satellite.

During operation, hosted users 260 (e.g., N number of hosted users 260) transmit 230 (via a terrestrial link with internet protocol security (IPSec) virtual private network (VPN)) requests to a secure enclave 252 of a host satellite operation center (SOC) 250, where each of the requests comprises service specifications for the hosted user associated with the request. The various different types of service specifications that may be transmitted include, but are not limited to, regions of antenna coverage, effective isotropic radiation power (EIRP) for the antenna coverage, and a time period of when the antenna coverage is to occur. For example, hosted user #1 260 may transmit 230 a request(s) comprising service specifications for specific regions on the Earth to receive antenna coverage (e.g., by specifying latitude and longitude coordinates, geocentric coordinates, and/or geodetic coordinates for the coverage region(s)), the lowest level of EIRP to be received for those regions for the antenna coverage, and a time period of when the antenna overage is to occur.

After the secure enclave 252 receives the requests, the secure enclave 252 generates unencrypted hosted commands for each of the requests according to the service specifications of the associated request. The hosted commands are commands that are used to configure each of the portions of the host/hosted payload 206 that are utilized by the hosted users 260. Then, the secure enclave 252 encrypts the unencrypted hosted commands for each of the requests by utilizing a respective hosted communication security (COMSEC) variety for the hosted user associated with the request to produce encrypted hosted commands. As such, for each hosted user 260, a different hosted COMSEC variety will be utilized for the encryption of the hosted commands associated with that hosted user 260. It follows that for N number of hosted users 206, N number of hosted COMSEC varieties will be utilized to encrypt the hosted commands. However, it should be noted that for the encryption of the hosted user commands, COMSEC variety 2 to COMSEC variety N+1 will be utilized. For example, hosted commands associated with a request(s) from hosted user #1 260 will be encrypted with COMSEC variety 2, hosted commands associated with a request(s) from hosted user #2 260 will be encrypted with COMSEC variety 3, hosted commands associated with a request(s) from hosted user #3 260 will be encrypted with COMSEC variety 4, . . . and hosted commands associated with a request(s) from hosted user #N 260 will be encrypted with COMSEC variety N+1. It should be noted that the hosted COMSEC varieties may each include at least one encryption key and/or at least one algorithm (e.g., a Type 1 encryption algorithm or a Type 2 encryption algorithm). Then, the secure enclave 252 transmits 231 the encrypted hosted commands to a satellite operation portion 251 of the host SOC 250.

The satellite operation portion 251 of the host SOC 250 generates unencrypted host commands according to service specifications for the host user. The host commands are commands that are used to configure the portion of the host/hosted payload 206 that is utilized by the host user. The various different types of service specifications that may be specified by the host user include, but are not limited to, regions of antenna coverage, effective isotropic radiation power (EIRP) for the antenna coverage, and a time period of when the antenna coverage is to occur. Then, the satellite operation portion 251 encrypts the unencrypted host commands by utilizing a host COMSEC variety (e.g., COMSEC variety 1) to produce encrypted host commands. It should be noted that the host COMSEC variety may include at least one encryption key and/or at least one algorithm (e.g., a Type 1 encryption algorithm or a Type 2 encryption algorithm).

The satellite operation portion 251 of the host SOC 250 then transmits 215 (via a terrestrial link with IPSec VPN) the encrypted host commands to a ground SOC antenna 216. Then, the SOC antenna 216 transmits 220 the encrypted host commands to a command antenna 221 on the vehicle 210. The SOC antenna 216 transmits 220 the encrypted host commands utilizing an out-of-band frequency band(s) (i.e. a frequency band(s) that is not the same frequency band(s) utilized to transmit payload data). The command antenna 221 on the vehicle 210 then transmits 222 the encrypted host commands to a command receiver 235.

The command receiver 235 then transmits 253 the encrypted host commands to a host communication security module 262. The host communication security module 262 decrypts the encrypted host commands utilizing the host COMSEC variety (e.g., COMSEC variety 1) to generate the unencrypted host commands.

It should be noted that the host communication security module 262 may comprise one or more communication security modules (e.g., communication security module 1 and communication security module 2, where communication security module 2 is a redundant communication security module that is utilized when there is a failure of communication security module 1), where the extra communication security modules are redundant communication security modules that are utilized when there is a communication security module failure. In addition, the host communication security module 262 may comprise one or more processors.

The satellite operation portion 251 of the host SOC 250 also transmits 234 the encrypted hosted commands to a ground host gateway antenna 227. Then, the host gateway antenna 227 transmits 235 the encrypted hosted commands to a payload antenna 280 on the vehicle 210. The host gateway antenna 227 transmits 235 the encrypted hosted commands utilizing an inband frequency band(s) (i.e. a frequency band(s) that is the same frequency band(s) utilized to transmit payload data). The payload antenna 280 on the vehicle 210 then transmits the encrypted hosted commands to a host/hosted payload 206. The host/hosted payload 206 transmits 236 the encrypted hosted commands to hosted communication security modules 263. The hosted communication security modules 263 decrypt the encrypted hosted commands utilizing the hosted COMSEC varieties (e.g., COMSEC variety 2 to COMSEC variety N+1) to generate the unencrypted hosted commands.

It should be noted that the hosted communication security modules 263 may each comprise one or more communication security modules (e.g., communication security module 1 and communication security module 2, where communication security module 2 is a redundant communication security module that is utilized when there is a failure of communication security module 1), where the extra communication security modules are redundant communication security modules that are utilized when there is a communication security module failure. In addition, the host communication security modules 263 may each comprise one or more processors.

The host communication security module 262 then transmits 270 the unencrypted host commands to the host/hosted payload 206. Also, the hosted communication security modules 263 then transmit 271 the unencrypted hosted commands to the host/hosted payload 206. The host/hosted payload 206 is reconfigured according to the unencrypted host commands and the unencrypted hosted commands. The reconfiguring of the host/hosted payload 206 may comprise adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one beam, transponder beamforming settings, effective isotropic radiation power (EIRP) for at least one beam, transponder channels, or beam steering. Additionally, the reconfiguring of the host/hosted payload 206 may comprise reconfiguring at least one of: the payload antenna 280, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix. In one or more embodiments, the host/hosted payload comprises 106 one or more processors.

After the host/hosted payload 206 is reconfigured, a payload antenna 280 then transmits (e.g., in one or more antenna beams 281) host user data to a host user antenna 285 on the ground and hosted user data to a hosted user antenna 290 on the ground. It should be noted that in other embodiments, the host user antenna 285 and/or the hosted user antenna 290 may be airborne (e.g., located on an aircraft or satellite) or marine (e.g., located on a ship) rather than terrestrial (e.g., located on the ground) as is shown in FIG. 2.

Also, it should be noted that, although in FIG. 2, antenna beam 281 is shown to include a single circular spot beam; in other embodiments, the antenna beam 281 may include more than one beam as is shown in FIG. 2 (e.g., antenna beam 281 may include multiple beams, and antenna beam 281 may include beams of different shapes than the circular spot beam as is shown in FIG. 2 (e.g., antenna beam 281 may include elliptical beams and/or shaped beams of various different shapes).

It should be noted that in one or more embodiments, the payload antenna 280 may comprise one or more reflector dishes including, but not limited to, parabolic reflectors and/or shaped reflectors. In addition, the payload antenna 280 may comprise one or more multifeed antenna arrays.

The host/hosted payload 206 transmits 209 unencrypted host telemetry (i.e. telemetry data related to the portion of the host/hosted payload 206 that is utilized by the host user) to the host communication security module 262. The host communication security module 262 then encrypts the unencrypted host telemetry utilizing the host COMSEC variety (i.e. COMESEC variety 1) to generate encrypted host telemetry. Also, the host/hosted payload 206 transmits 272 unencrypted hosted telemetry (i.e. telemetry data related to the portions of the host/hosted payload 206 that are utilized by the hosted users) to the hosted communication security modules 263. The hosted communication security modules 263 then encrypt the unencrypted hosted telemetry utilizing the hosted COMSEC varieties (i.e. COMSEC variety 2 to COMSEC variety N+1) to generate encrypted hosted telemetry. As such, for each hosted user 260, a different hosted COMSEC variety will be utilized for the encryption of the unencrypted hosted telemetry associated with that hosted user 260.

The host communication security module 262 then transmits 293 the encrypted host telemetry to a telemetry transmitter 294. The telemetry transmitter 294 then transmits 295 the encrypted host telemetry to a telemetry antenna 223. The telemetry antenna 223 then transmits 297 the encrypted host telemetry to the SOC antenna 216. The SOC antenna 216 then transmits 298 (via a terrestrial link with IPSec VPN) the encrypted host telemetry to the satellite operation portion 251 of the host SOC 250. The satellite operation portion 251 then decrypts the encrypted host telemetry utilizing the host COMSEC variety (i.e. COMSEC variety 1) to generate the unencrypted host telemetry.

The hosted communication security modules 263 also transmit 237 the encrypted hosted telemetry to the host/hosted payload 206. The host/hosted payload 206 then transmits the encrypted hosted telemetry to the payload antenna 280. The payload antenna 280 then transmits 238 the encrypted hosted telemetry to the host gateway antenna 227. The host gateway antenna 227 then transmits 239 (via a terrestrial link with IPSec VPN) the encrypted hosted telemetry to the satellite operation portion 251 of the host SOC 250.

The satellite operation portion 251 transmits 232 the encrypted hosted telemetry to the secure enclave 252 of the host SOC 250. The secure enclave 252 decrypts the encrypted hosted telemetry utilizing the hosted COMSEC varieties (e.g., COMSEC variety 2 to COMSEC variety N+1) to generate the unencrypted hosted telemetry. The secure enclave 252 then transmits 233 (via a terrestrial link with IPSec VPN) the unencrypted hosted telemetry respectively to the hosted users 260 that the unencrypted telemetry is associated.

FIGS. 3A and 3B together show a flow chart for the disclosed method for commercial satellite operations with secure enclave for payload operations for the systems shown in FIGS. 1 and 2, in accordance with at least one embodiment of the present disclosure. At the start 300 of the method, a secure enclave of a host satellite operation center (SOC) receives at least one request from at least one hosted user, where each of the requests comprises service specifications for the hosted user associated with the request 305. Then, the secure enclave generates unencrypted hosted commands for each of the requests according to the service specifications of the request 310. The secure enclave then encrypts the unencrypted hosted commands for each of the requests by utilizing a respective hosted communication security (COMSEC) variety for the hosted user associated with the request to produce encrypted hosted commands 315. A SOC operation portion of the host SOC generates unencrypted host commands according to service specifications for a host user 320. Then, the SOC operation portion encrypts unencrypted host commands by utilizing a host COMSEC variety to produce encrypted host commands 325. The host SOC then transmits the encrypted host commands and the encrypted hosted commands to a vehicle 330.

Then, a host communication security module on the vehicle decrypts the encrypted host commands by utilizing the host COMSEC variety to produce the unencrypted host commands 335. A respective hosted communication security module on the vehicle for each of the hosted users decrypts the encrypted hosted commands for each of the hosted users by utilizing the respective hosted COMSEC variety to produce the unencrypted hosted commands 340. A host/hosted payload on the vehicle is reconfigured according to the unencrypted host commands and the unencrypted hosted commands 345. A payload antenna on the vehicle then transmits host user data to a host user antenna and hosted user data to a hosted user antenna 350. Then, the host/hosted payload generates unencrypted host telemetry and unencrypted hosted telemetry 355. The host communication security module then encrypts the unencrypted host telemetry by utilizing the host COMSEC variety to produce encrypted host telemetry 360. The respective hosted communication security module for each of the hosted users then encrypts the unencrypted hosted telemetry for each of the hosted users by utilizing the respective hosted COMSEC variety to produce the encrypted hosted telemetry 365. Then, the vehicle transmits the encrypted host telemetry and the encrypted hosted telemetry to the host SOC 370.

Then, the SOC operation portion decrypts the encrypted host telemetry by utilizing the host COMSEC variety to produce the unencrypted host telemetry 375. The secure enclave then decrypts the encrypted hosted telemetry for each of the hosted users by utilizing the respective hosted COMSEC variety to produce the unencrypted hosted telemetry for each of the hosted users 380. Then, the method ends 385.

FIGS. 4-7C are related to systems, methods, and apparatus for commercial satellite operations with secure enclave for payload operations employing a vehicle with a host payload and at least one separate hosted payload.

FIG. 4 is a diagram showing the disclosed system for commercial satellite operations with secure enclave for payload operations; where (1) the vehicle employs a digital host payload 406 and at least one analog hosted payload 407, and (2) the host commanding, hosted commanding, host telemetry, and hosted telemetry are all transmitted out-of-band, in accordance with at least one embodiment of the present disclosure. In this figure, a vehicle 410 and a host satellite operations center (SOC) 450 are shown. Various different types of vehicles may be employed for the vehicle 410 including, but not limited to, an airborne vehicle. And, various different types of airborne vehicles may be employed for the vehicle 410 including, but not limited to, a satellite, an aircraft, an unmanned aerial vehicle (UAV), and a space plane.

In the case of a satellite being employed for the vehicle 410, it should be noted that satellites typically include computer-controlled systems. A satellite generally includes a bus and a payload(s) (e.g., a host payload 406 and/or a hosted payload(s) 407). The bus may include systems (which include components) that control the satellite. These systems perform tasks, such as power generation and control, thermal control, telemetry, attitude control, orbit control, and other suitable operations.

The payload of the satellite provides functions to users of the satellite. The payload may include antennas, transponders, and other suitable devices. For example, with respect to communications, the payload in a satellite may be used to provide Internet access, telephone communications, radio, television, and/or other types of communications. Different entities may use the different payloads (i.e. the host payload 406 and the hosted payload(s) 407) on the satellite. For example, a host user (e.g., an owner of the satellite) may utilize the host payload 406, and the host user may lease out at least one hosted payload(s) 407 to hosted users (e.g., customers) to use.

Leasing a payload(s) (e.g., a hosted payload(s) 407) to a customer(s) (e.g., a hosted user(s)) may increase the revenues that an owner (e.g., the host user) of a satellite can obtain. Further, a customer may use a subset of the total resources in a satellite for a cost that is less than the cost for the customer to purchase and operate a satellite, to build and operate a satellite, or to lease an entire satellite.

During operation, hosted users 460 (e.g., N number of hosted users 460) transmit 430 (via a terrestrial link with internet protocol security (IPSec) virtual private network (VPN)) requests to a secure enclave 452 of a host satellite operation center (SOC) 450, where each of the requests comprises service specifications for the hosted user associated with the request. The various different types of service specifications that may be transmitted include, but are not limited to, regions of antenna coverage, effective isotropic radiation power (EIRP) for the antenna coverage, and a time period of when the antenna coverage is to occur. For example, hosted user #1 460 may transmit 430 a request(s) comprising service specifications for specific regions on the Earth to receive antenna coverage (e.g., by specifying latitude and longitude coordinates, geocentric coordinates, and/or geodetic coordinates for the coverage region(s)), the lowest level of EIRP to be received for those regions for the antenna coverage, and a time period of when the antenna overage is to occur.

After the secure enclave 452 receives the requests, the secure enclave 452 generates unencrypted hosted commands for each of the requests according to the service specifications of the associated request. The hosted commands are commands that are used to configure the hosted payload(s) 407 that are utilized by the hosted users 460. Then, the secure enclave 452 encrypts the unencrypted hosted commands for each of the requests by utilizing a respective hosted communication security (COMSEC) variety for the hosted user associated with the request to produce encrypted hosted commands. As such, for each hosted user 460, a different hosted COMSEC variety will be utilized for the encryption of the hosted commands associated with that hosted user 460. It follows that for N number of hosted users 406, N number of hosted COMSEC varieties will be utilized to encrypt the hosted commands. However, it should be noted that for the encryption of the hosted user commands, COMSEC variety 2 to COMSEC variety N+1 will be utilized. For example, hosted commands associated with a request(s) from hosted user #1 460 will be encrypted with COMSEC variety 2, hosted commands associated with a request(s) from hosted user #2 460 will be encrypted with COMSEC variety 3, hosted commands associated with a request(s) from hosted user #3 460 will be encrypted with COMSEC variety 4, . . . and hosted commands associated with a request(s) from hosted user #N 460 will be encrypted with COMSEC variety N+1. It should be noted that the hosted COMSEC varieties may each include at least one encryption key and/or at least one algorithm (e.g., a Type 1 encryption algorithm or a Type 2 encryption algorithm). Then, the secure enclave 452 transmits 431 the encrypted hosted commands to a satellite operation portion 451 of the host SOC 450.

The satellite operation portion 451 of the host SOC 450 generates unencrypted host commands according to service specifications for the host user. The host commands are commands that are used to configure the host payload 406 that is utilized by the host user. The various different types of service specifications that may be specified by the host user include, but are not limited to, regions of antenna coverage, effective isotropic radiation power (EIRP) for the antenna coverage, and a time period of when the antenna coverage is to occur. Then, the satellite operation portion 451 encrypts the unencrypted host commands by utilizing a host COMSEC variety (e.g., COMSEC variety 1) to produce encrypted host commands. It should be noted that the host COMSEC variety may include at least one encryption key and/or at least one algorithm (e.g., a Type 1 encryption algorithm or a Type 2 encryption algorithm).

The satellite operation portion 451 of the host SOC 450 then transmits 415 (via a terrestrial link with IPSec VPN) the encrypted host commands and the encrypted hosted commands to a ground SOC antenna 416. Then, the SOC antenna 416 transmits 420 the encrypted host commands and the encrypted hosted commands to a command antenna 421 on the vehicle 410. The SOC antenna 416 transmits 420 the encrypted host commands and the encrypted hosted commands utilizing an out-of-band frequency band(s) (i.e. a frequency band(s) that is not the same frequency band(s) utilized to transmit payload data). The command antenna 421 on the vehicle 410 then transmits 422 the encrypted host commands to a command receiver 435.

The command receiver 435 then transmits 454 the encrypted host commands to a host communication security module 462. The host communication security module 462 decrypts the encrypted host commands utilizing the host COMSEC variety (e.g., COMSEC variety 1) to generate the unencrypted host commands.

It should be noted that the host communication security module 462 may comprise one or more communication security modules (e.g., communication security module 1 and communication security module 2, where communication security module 2 is a redundant communication security module that is utilized when there is a failure of communication security module 1), where the extra communication security modules are redundant communication security modules that are utilized when there is a communication security module failure. In addition, the host communication security module 462 may comprise one or more processors.

The command receiver 435 also transmits 453 the encrypted hosted commands to hosted communication security modules 463. The hosted communication security modules 463 decrypt the encrypted hosted commands utilizing the hosted COMSEC varieties (e.g., COMSEC variety 2 to COMSEC variety N+1) to generate the unencrypted hosted commands.

It should be noted that the hosted communication security modules 463 may each comprise one or more communication security modules (e.g., communication security module 1 and communication security module 2, where communication security module 2 is a redundant communication security module that is utilized when there is a failure of communication security module 1), where the extra communication security modules are redundant communication security modules that are utilized when there is a communication security module failure. In addition, the host communication security modules 463 may each comprise one or more processors.

The host communication security module 462 then transmits 470 the unencrypted host commands to the host payload 406, and transmits 464 an on/off command to at least one hosted payload 407. Also, the hosted communication security modules 463 transmit 471 the unencrypted hosted commands to the hosted payload(s) 407.

The host payload 406 is reconfigured according to the unencrypted host commands. The hosted payload(s) 407 is commanded on according to the on/off command. It should be noted that the hosted payload(s) 407 may later be commanded off according to another on/off command. After the hosted payload(s) 407 is commanded on, the hosted payload(s) 407 is reconfigured according to the unencrypted hosted commands.

The reconfiguring of the host payload 406 and/or the hosted payload(s) 407 may comprise adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one beam, transponder beamforming settings, effective isotropic radiation power (EIRP) for at least one beam, transponder channels, or beam steering. Additionally, the reconfiguring of the host payload 406 and/or the hosted payload(s) 407 may comprise reconfiguring at least one of: a host payload antenna 480, a hosted payload antenna 482, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix. In one or more embodiments, the host payload 406 and/or the hosted payload(s) 407 comprise one or more processors.

After the host payload 406 is reconfigured, a host payload antenna 480 then transmits (e.g., in one or more antenna beams 481) host user data to a host user antenna 485 on the ground. And, after the hosted payload(s) 407 is reconfigured (e.g., the hosted payload antenna 482 is gimbaled or steered to radiate to a specified region on Earth), the hosted payload antenna 482 transmits (e.g., in one or more antenna beams 408) hosted user data to a hosted user antenna 490 on the ground. It should be noted that in other embodiments, the host user antenna 485 and/or the hosted user antenna 490 may be airborne (e.g., located on an aircraft or satellite) or marine (e.g., located on a ship) rather than terrestrial (e.g., located on the ground) as is shown in FIG. 4.

Also, it should be noted that, although in FIG. 4, antenna beam 481 and antenna beam 408 are each shown to include a single circular spot beam; in other embodiments, the antenna beam 481 and antenna beam 408 may each include more than one beam as is shown in FIG. 4 (e.g., antenna beam 481 and/or antenna beam 408 may each include multiple beams, and antenna beam 481 and/or antenna beam 408 may each include beams of different shapes than the circular spot beam as is shown in FIG. 4 (e.g., antenna beam 481 and/or antenna beam 408 may each include elliptical beams and/or shaped beams of various different shapes).

It should be noted that in one or more embodiments, the host payload antenna 480 and/or the hosted payload antenna 482 may each comprise one or more reflector dishes including, but not limited to, parabolic reflectors and/or shaped reflectors. In addition, the host payload antenna 480 and/or the hosted payload antenna 482 may each comprise one or more multifeed antenna arrays.

The host payload 406 transmits 409 unencrypted host telemetry (i.e. telemetry data related to the host payload 406 that is utilized by the host user) to the host communication security module 462. The host communication security module 462 then encrypts the unencrypted host telemetry utilizing the host COMSEC variety (i.e. COMESEC variety 1) to generate encrypted host telemetry.

Also, the hosted payload(s) 407 transmits 472 unencrypted hosted telemetry (i.e. telemetry data related to the hosted payload(s) 407 that is utilized by the hosted user(s)) to the hosted communication security modules 463. The hosted communication security modules 463 then encrypt the unencrypted hosted telemetry utilizing the hosted COMSEC varieties (i.e. COMSEC variety 2 to COMSEC variety N+1) to generate encrypted hosted telemetry. As such, for each hosted user 460, a different hosted COMSEC variety will be utilized for the encryption of the unencrypted hosted telemetry associated with that hosted user 460.

The host communication security module 462 then transmits 493 the encrypted host telemetry to a telemetry transmitter 494. And, the hosted communication security modules 463 then transmit 492 the encrypted hosted telemetry to the telemetry transmitter 494. The telemetry transmitter 494 then transmits 495 the encrypted host telemetry and the encrypted hosted telemetry to a telemetry antenna 423. The telemetry antenna 423 then transmits 497 the encrypted host telemetry and the encrypted hosted telemetry to the SOC antenna 416. The SOC antenna 416 then transmits 498 (via a terrestrial link with IPSec VPN) the encrypted host telemetry and the encrypted hosted telemetry to the satellite operation portion 451 of the host SOC 450. The satellite operation portion 451 then decrypts the encrypted host telemetry utilizing the host COMSEC variety (i.e. COMSEC variety 1) to generate the unencrypted host telemetry.

The satellite operation portion 451 transmits 432 the encrypted hosted telemetry to the secure enclave 452 of the host SOC 450. The secure enclave 452 decrypts the encrypted hosted telemetry utilizing the hosted COMSEC varieties (e.g., COMSEC variety 2 to COMSEC variety N+1) to generate the unencrypted hosted telemetry. The secure enclave 452 then transmits 433 (via a terrestrial link with IPSec VPN) the unencrypted hosted telemetry respectively to the hosted users 460 that the unencrypted telemetry is associated.

FIG. 5 is a diagram showing the disclosed system for commercial satellite operations with secure enclave for payload operations; where (1) the vehicle employs a digital host payload 506 and at least one analog hosted payload 507, and (2) the hosted commanding and hosted telemetry are transmitted out-of-band, and the host commanding and host telemetry are transmitted inband, in accordance with at least one embodiment of the present disclosure. In this figure, a vehicle 510 and a host satellite operations center (SOC) 550 are shown. Various different types of vehicles may be employed for the vehicle 510 including, but not limited to, an airborne vehicle. And, various different types of airborne vehicles may be employed for the vehicle 410 including, but not limited to, a satellite, an aircraft, an unmanned aerial vehicle (UAV), and a space plane.

In the case of a satellite being employed for the vehicle 510, it should be noted that satellites typically include computer-controlled systems. A satellite generally includes a bus and a payload(s) (e.g., a host payload 506 and/or a hosted payload(s) 507). The bus may include systems (which include components) that control the satellite. These systems perform tasks, such as power generation and control, thermal control, telemetry, attitude control, orbit control, and other suitable operations.

The payload of the satellite provides functions to users of the satellite. The payload may include antennas, transponders, and other suitable devices. For example, with respect to communications, the payload in a satellite may be used to provide Internet access, telephone communications, radio, television, and/or other types of communications. Different entities may use the different payloads (i.e. the host payload 506 and the hosted payload(s) 507) on the satellite. For example, a host user (e.g., an owner of the satellite) may utilize the host payload 506, and the host user may lease out at least one hosted payload(s) 507 to hosted users (e.g., customers) to use.

Leasing a payload(s) (e.g., a hosted payload(s) 507) to a customer(s) (e.g., a hosted user(s)) may increase the revenues that an owner (e.g., the host user) of a satellite can obtain. Further, a customer may use a subset of the total resources in a satellite for a cost that is less than the cost for the customer to purchase and operate a satellite, to build and operate a satellite, or to lease an entire satellite.

During operation, hosted users 560 (e.g., N number of hosted users 560) transmit 530 (via a terrestrial link with internet protocol security (IPSec) virtual private network (VPN)) requests to a secure enclave 552 of a host satellite operation center (SOC) 550, where each of the requests comprises service specifications for the hosted user associated with the request. The various different types of service specifications that may be transmitted include, but are not limited to, regions of antenna coverage, effective isotropic radiation power (EIRP) for the antenna coverage, and a time period of when the antenna coverage is to occur. For example, hosted user #1 560 may transmit 530 a request(s) comprising service specifications for specific regions on the Earth to receive antenna coverage (e.g., by specifying latitude and longitude coordinates, geocentric coordinates, and/or geodetic coordinates for the coverage region(s)), the lowest level of EIRP to be received for those regions for the antenna coverage, and a time period of when the antenna overage is to occur.

After the secure enclave 552 receives the requests, the secure enclave 552 generates unencrypted hosted commands for each of the requests according to the service specifications of the associated request. The hosted commands are commands that are used to configure the hosted payload(s) 507 that are utilized by the hosted users 560. Then, the secure enclave 552 encrypts the unencrypted hosted commands for each of the requests by utilizing a respective hosted communication security (COMSEC) variety for the hosted user associated with the request to produce encrypted hosted commands. As such, for each hosted user 560, a different hosted COMSEC variety will be utilized for the encryption of the hosted commands associated with that hosted user 560. It follows that for N number of hosted users 506, N number of hosted COMSEC varieties will be utilized to encrypt the hosted commands. However, it should be noted that for the encryption of the hosted user commands, COMSEC variety 2 to COMSEC variety N+1 will be utilized. For example, hosted commands associated with a request(s) from hosted user #1 560 will be encrypted with COMSEC variety 2, hosted commands associated with a request(s) from hosted user #2 560 will be encrypted with COMSEC variety 3, hosted commands associated with a request(s) from hosted user #3 560 will be encrypted with COMSEC variety 4, . . . and hosted commands associated with a request(s) from hosted user #N 560 will be encrypted with COMSEC variety N+1. It should be noted that the hosted COMSEC varieties may each include at least one encryption key and/or at least one algorithm (e.g., a Type 1 encryption algorithm or a Type 2 encryption algorithm). Then, the secure enclave 552 transmits 531 the encrypted hosted commands to a satellite operation portion 551 of the host SOC 550.

The satellite operation portion 551 of the host SOC 550 generates unencrypted host commands according to service specifications for the host user. The host commands are commands that are used to configure the host payload 506 that is utilized by the host user. The various different types of service specifications that may be specified by the host user include, but are not limited to, regions of antenna coverage, effective isotropic radiation power (EIRP) for the antenna coverage, and a time period of when the antenna coverage is to occur. Then, the satellite operation portion 551 encrypts the unencrypted host commands by utilizing a host COMSEC variety (e.g., COMSEC variety 1) to produce encrypted host commands. It should be noted that the host COMSEC variety may include at least one encryption key and/or at least one algorithm (e.g., a Type 1 encryption algorithm or a Type 2 encryption algorithm).

The satellite operation portion 551 of the host SOC 550 then transmits 515 (via a terrestrial link with IPSec VPN) the encrypted hosted commands to a ground SOC antenna 516. Then, the SOC antenna 516 transmits 520 the encrypted hosted commands to a command antenna 521 on the vehicle 510. The SOC antenna 516 transmits 520 the encrypted hosted commands utilizing an out-of-band frequency band(s) (i.e. a frequency band(s) that is not the same frequency band(s) utilized to transmit payload data). The command antenna 521 on the vehicle 510 then transmits 522 the encrypted hosted commands to a command receiver 535.

The command receiver 535 then transmits 553 the encrypted hosted commands to hosted communication security modules 563. The hosted communication security modules 563 decrypt the encrypted hosted commands utilizing the hosted COMSEC varieties (e.g., COMSEC variety 2 to COMSEC variety N+1) to generate the unencrypted hosted commands.

It should be noted that the hosted communication security modules 563 may each comprise one or more communication security modules (e.g., communication security module 1 and communication security module 2, where communication security module 2 is a redundant communication security module that is utilized when there is a failure of communication security module 1), where the extra communication security modules are redundant communication security modules that are utilized when there is a communication security module failure. In addition, the host communication security modules 563 may each comprise one or more processors.

The satellite operation portion 551 of the host SOC 550 also transmits 534 the encrypted host commands to a ground host gateway antenna 527. Then, the host gateway antenna 527 transmits 535 the encrypted host commands to a host payload antenna 580 on the vehicle 510. The host gateway antenna 527 transmits 535 the encrypted host commands utilizing an inband frequency band(s) (i.e. a frequency band(s) that is the same frequency band(s) utilized to transmit payload data). The host payload antenna 580 on the vehicle 510 then transmits the encrypted host commands to a host payload 506. The host payload 506 transmits 554 the encrypted host commands to host communication security module 562. The host communication security module 562 decrypts the encrypted host commands utilizing the host COMSEC variety (e.g., COMSEC variety 1) to generate the unencrypted host commands.

It should be noted that the host communication security module 562 may comprise one or more communication security modules (e.g., communication security module 1 and communication security module 2, where communication security module 2 is a redundant communication security module that is utilized when there is a failure of communication security module 1), where the extra communication security modules are redundant communication security modules that are utilized when there is a communication security module failure. In addition, the host communication security module 562 may comprise one or more processors.

The host communication security module 562 then transmits 570 the unencrypted host commands to the host payload 506, and transmits 564 an on/off command to at least one hosted payload 507. Also, the hosted communication security modules 563 transmit 571 the unencrypted hosted commands to the hosted payload(s) 507.

The host payload 506 is reconfigured according to the unencrypted host commands. The hosted payload(s) 507 is commanded on according to the on/off command. It should be noted that the hosted payload(s) 507 may later be commanded off according to another on/off command. After the hosted payload(s) 507 is commanded on, the hosted payload(s) 507 is reconfigured according to the unencrypted hosted commands.

The reconfiguring of the host payload 506 and/or the hosted payload(s) 507 may comprise adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one beam, transponder beamforming settings, effective isotropic radiation power (EIRP) for at least one beam, transponder channels, or beam steering. Additionally, the reconfiguring of the host payload 506 and/or the hosted payload(s) 507 may comprise reconfiguring at least one of: a host payload antenna 580, a hosted payload antenna 582 (e.g., by steering the antenna), at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix. In one or more embodiments, the host payload 506 and/or the hosted payload(s) 507 comprise one or more processors.

After the host payload 506 is reconfigured, a host payload antenna 580 then transmits (e.g., in one or more antenna beams 581) host user data to a host user antenna 585 on the ground. And, after the hosted payload(s) 507 is reconfigured (e.g., the hosted payload antenna 582 is gimbaled or steered to radiate to a specified region on Earth), the hosted payload antenna 582 transmits (e.g., in one or more antenna beams 508) hosted user data to a hosted user antenna 590 on the ground. It should be noted that in other embodiments, the host user antenna 585 and/or the hosted user antenna 590 may be airborne (e.g., located on an aircraft or satellite) or marine (e.g., located on a ship) rather than terrestrial (e.g., located on the ground) as is shown in FIG. 5.

Also, it should be noted that, although in FIG. 5, antenna beam 581 and antenna beam 508 are each shown to include a single circular spot beam; in other embodiments, the antenna beam 581 and antenna beam 508 may each include more than one beam as is shown in FIG. 5 (e.g., antenna beam 581 and/or antenna beam 508 may each include multiple beams, and antenna beam 581 and/or antenna beam 508 may each include beams of different shapes than the circular spot beam as is shown in FIG. 5 (e.g., antenna beam 581 and/or antenna beam 508 may each include elliptical beams and/or shaped beams of various different shapes).

It should be noted that in one or more embodiments, the host payload antenna 580 and/or the hosted payload antenna 582 may each comprise one or more reflector dishes including, but not limited to, parabolic reflectors and/or shaped reflectors. In addition, the host payload antenna 580 and/or the hosted payload antenna 582 may each comprise one or more multifeed antenna arrays.

The host payload 506 transmits 509 unencrypted host telemetry (i.e. telemetry data related to the host payload 506 that is utilized by the host user) to the host communication security module 562. The host communication security module 562 then encrypts the unencrypted host telemetry utilizing the host COMSEC variety (i.e. COMESEC variety 1) to generate encrypted host telemetry.

Also, the hosted payload(s) 507 transmits 572 unencrypted hosted telemetry (i.e. telemetry data related to the hosted payload(s) 507 that is utilized by the hosted user(s)) to the hosted communication security modules 563. The hosted communication security modules 563 then encrypt the unencrypted hosted telemetry utilizing the hosted COMSEC varieties (i.e. COMSEC variety 2 to COMSEC variety N+1) to generate encrypted hosted telemetry. As such, for each hosted user 560, a different hosted COMSEC variety will be utilized for the encryption of the unencrypted hosted telemetry associated with that hosted user 560.

The hosted communication security module 563 then transmits 593 the encrypted hosted telemetry to a telemetry transmitter 594. The telemetry transmitter 594 then transmits 595 the encrypted hosted telemetry to a telemetry antenna 523. The telemetry antenna 523 then transmits 597 the encrypted hosted telemetry to the SOC antenna 516. The SOC antenna 516 then transmits 598 (via a terrestrial link with IPSec VPN) the encrypted hosted telemetry to the satellite operation portion 551 of the host SOC 550.

The satellite operation portion 551 transmits 532 the encrypted hosted telemetry to the secure enclave 552 of the host SOC 550. The secure enclave 552 decrypts the encrypted hosted telemetry utilizing the hosted COMSEC varieties (e.g., COMSEC variety 2 to COMSEC variety N+1) to generate the unencrypted hosted telemetry. The secure enclave 552 then transmits 533 (via a terrestrial link with IPSec VPN) the unencrypted hosted telemetry respectively to the hosted users 560 that the unencrypted telemetry is associated.

The host communication security module 562 also transmits 596 the encrypted host telemetry to the host payload 506. The host payload 506 then transmits the encrypted host telemetry to the host payload antenna 580. The host payload antenna 580 then transmits 538 the encrypted host telemetry to the host gateway antenna 527. The host gateway antenna 527 then transmits 539 (via a terrestrial link with IPSec VPN) the encrypted host telemetry to the satellite operation portion 551 of the host SOC 550. The satellite operation portion 551 then decrypts the encrypted host telemetry utilizing the host COMSEC variety (i.e. COMSEC variety 1) to generate the unencrypted host telemetry.

FIG. 6 is a diagram showing the disclosed system for commercial satellite operations with secure enclave for payload operations; where (1) the vehicle employs an analog host payload 606 and at least one digital hosted payload 607, and (2) the host commanding and host telemetry are transmitted out-of-band, and the hosted commanding and hosted telemetry are transmitted inband, in accordance with at least one embodiment of the present disclosure. In this figure, a vehicle 610 and a host satellite operations center (SOC) 650 are shown. Various different types of vehicles may be employed for the vehicle 610 including, but not limited to, an airborne vehicle. And, various different types of airborne vehicles may be employed for the vehicle 610 including, but not limited to, a satellite, an aircraft, an unmanned aerial vehicle (UAV), and a space plane.

In the case of a satellite being employed for the vehicle 610, it should be noted that satellites typically include computer-controlled systems. A satellite generally includes a bus and a payload(s) (e.g., a host payload 606 and/or a hosted payload(s) 607). The bus may include systems (which include components) that control the satellite. These systems perform tasks, such as power generation and control, thermal control, telemetry, attitude control, orbit control, and other suitable operations.

The payload of the satellite provides functions to users of the satellite. The payload may include antennas, transponders, and other suitable devices. For example, with respect to communications, the payload in a satellite may be used to provide Internet access, telephone communications, radio, television, and/or other types of communications. Different entities may use the different payloads (i.e. the host payload 606 and the hosted payload(s) 607) on the satellite. For example, a host user (e.g., an owner of the satellite) may utilize the host payload 606, and the host user may lease out at least one hosted payload(s) 607 to hosted users (e.g., customers) to use.

Leasing a payload(s) (e.g., a hosted payload(s) 607) to a customer(s) (e.g., a hosted user(s)) may increase the revenues that an owner (e.g., the host user) of a satellite can obtain. Further, a customer may use a subset of the total resources in a satellite for a cost that is less than the cost for the customer to purchase and operate a satellite, to build and operate a satellite, or to lease an entire satellite.

During operation, hosted users 660 (e.g., N number of hosted users 660) transmit 630 (via a terrestrial link with internet protocol security (IPSec) virtual private network (VPN)) requests to a secure enclave 652 of a host satellite operation center (SOC) 650, where each of the requests comprises service specifications for the hosted user associated with the request. The various different types of service specifications that may be transmitted include, but are not limited to, regions of antenna coverage, effective isotropic radiation power (EIRP) for the antenna coverage, and a time period of when the antenna coverage is to occur. For example, hosted user #1 660 may transmit 630 a request(s) comprising service specifications for specific regions on the Earth to receive antenna coverage (e.g., by specifying latitude and longitude coordinates, geocentric coordinates, and/or geodetic coordinates for the coverage region(s)), the lowest level of EIRP to be received for those regions for the antenna coverage, and a time period of when the antenna overage is to occur.

After the secure enclave 652 receives the requests, the secure enclave 652 generates unencrypted hosted commands for each of the requests according to the service specifications of the associated request. The hosted commands are commands that are used to configure the hosted payload(s) 607 that are utilized by the hosted users 660. Then, the secure enclave 652 encrypts the unencrypted hosted commands for each of the requests by utilizing a respective hosted communication security (COMSEC) variety for the hosted user associated with the request to produce encrypted hosted commands. As such, for each hosted user 660, a different hosted COMSEC variety will be utilized for the encryption of the hosted commands associated with that hosted user 660. It follows that for N number of hosted users 606, N number of hosted COMSEC varieties will be utilized to encrypt the hosted commands. However, it should be noted that for the encryption of the hosted user commands, COMSEC variety 2 to COMSEC variety N+1 will be utilized. For example, hosted commands associated with a request(s) from hosted user #1 660 will be encrypted with COMSEC variety 2, hosted commands associated with a request(s) from hosted user #2 660 will be encrypted with COMSEC variety 3, hosted commands associated with a request(s) from hosted user #3 660 will be encrypted with COMSEC variety 4, . . . and hosted commands associated with a request(s) from hosted user #N 660 will be encrypted with COMSEC variety N+1. It should be noted that the hosted COMSEC varieties may each include at least one encryption key and/or at least one algorithm (e.g., a Type 1 encryption algorithm or a Type 2 encryption algorithm). Then, the secure enclave 652 transmits 631 the encrypted hosted commands to a satellite operation portion 651 of the host SOC 650.

The satellite operation portion 651 of the host SOC 650 generates unencrypted host commands according to service specifications for the host user. The host commands are commands that are used to configure the host payload 606 that is utilized by the host user. The various different types of service specifications that may be specified by the host user include, but are not limited to, regions of antenna coverage, effective isotropic radiation power (EIRP) for the antenna coverage, and a time period of when the antenna coverage is to occur. Then, the satellite operation portion 651 encrypts the unencrypted host commands by utilizing a host COMSEC variety (e.g., COMSEC variety 1) to produce encrypted host commands. It should be noted that the host COMSEC variety may include at least one encryption key and/or at least one algorithm (e.g., a Type 1 encryption algorithm or a Type 2 encryption algorithm).

The satellite operation portion 651 of the host SOC 650 then transmits 615 (via a terrestrial link with IPSec VPN) the encrypted host commands to a ground SOC antenna 616. Then, the SOC antenna 616 transmits 620 the encrypted host commands to a command antenna 621 on the vehicle 610. The SOC antenna 616 transmits 620 the encrypted host commands utilizing an out-of-band frequency band(s) (i.e. a frequency band(s) that is not the same frequency band(s) utilized to transmit payload data). The command antenna 621 on the vehicle 610 then transmits 622 the encrypted host commands to a command receiver 635.

The command receiver 635 then transmits 653 the encrypted host commands to a host communication security module 662. The host communication security module 662 decrypts the encrypted host commands utilizing the host COMSEC variety (e.g., COMSEC variety 1) to generate the unencrypted host commands.

It should be noted that the host communication security module 662 may comprise one or more communication security modules (e.g., communication security module 1 and communication security module 2, where communication security module 2 is a redundant communication security module that is utilized when there is a failure of communication security module 1), where the extra communication security modules are redundant communication security modules that are utilized when there is a communication security module failure. In addition, the host communication security module 662 may comprise one or more processors.

The satellite operation portion 651 of the host SOC 650 also transmits 634 the encrypted hosted commands to a ground host gateway antenna 627. Then, the host gateway antenna 627 transmits 635 the encrypted hosted commands to a hosted payload antenna 680 on the vehicle 610. The host gateway antenna 627 transmits 635 the encrypted host commands utilizing an inband frequency band(s) (i.e. a frequency band(s) that is the same frequency band(s) utilized to transmit payload data). The hosted payload antenna 680 on the vehicle 610 then transmits the encrypted hosted commands to a hosted payload 607. The hosted payload 607 transmits 654 the encrypted hosted commands to hosted communication security modules 663. The hosted communication security modules 663 decrypt the encrypted hosted commands utilizing the hosted COMSEC varieties (e.g., COMSEC variety 2 to COMSEC variety N+1) to generate the unencrypted hosted commands.

It should be noted that the hosted communication security modules 663 may each comprise one or more communication security modules (e.g., communication security module 1 and communication security module 2, where communication security module 2 is a redundant communication security module that is utilized when there is a failure of communication security module 1), where the extra communication security modules are redundant communication security modules that are utilized when there is a communication security module failure. In addition, the host communication security modules 663 may each comprise one or more processors.

The host communication security module 662 then transmits 670 the unencrypted host commands to the host payload 606, and transmits 664 an on/off command to at least one hosted payload 607. Also, the hosted communication security modules 663 transmit 671 the unencrypted hosted commands to the hosted payload(s) 607.

The host payload 606 is reconfigured according to the unencrypted host commands. The hosted payload(s) 607 is commanded on according to the on/off command. It should be noted that the hosted payload(s) 607 may later be commanded off according to another on/off command. After the hosted payload(s) 607 is commanded on, the hosted payload(s) 607 is reconfigured according to the unencrypted hosted commands.

The reconfiguring of the host payload 606 and/or the hosted payload(s) 607 may comprise adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one beam, transponder beamforming settings, effective isotropic radiation power (EIRP) for at least one beam, transponder channels, or beam steering. Additionally, the reconfiguring of the host payload 606 and/or the hosted payload(s) 607 may comprise reconfiguring at least one of: a hosted payload antenna 680, a host payload antenna 682 (e.g., by steering the antenna), at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix. In one or more embodiments, the host payload 606 and/or the hosted payload(s) 607 comprise one or more processors.

After the host payload 606 is reconfigured (e.g., the host payload antenna 682 is gimbaled or steered to radiate to a specified region on Earth), a host payload antenna 682 then transmits (e.g., in one or more antenna beams 608) host user data to a host user antenna 685 on the ground. And, after the hosted payload(s) 607 is reconfigured the hosted payload antenna 680 transmits (e.g., in one or more antenna beams 681) hosted user data to a hosted user antenna 690 on the ground. It should be noted that in other embodiments, the host user antenna 685 and/or the hosted user antenna 690 may be airborne (e.g., located on an aircraft or satellite) or marine (e.g., located on a ship) rather than terrestrial (e.g., located on the ground) as is shown in FIG. 6.

Also, it should be noted that, although in FIG. 6, antenna beam 681 and antenna beam 608 are each shown to include a single circular spot beam; in other embodiments, the antenna beam 681 and antenna beam 608 may each include more than one beam as is shown in FIG. 6 (e.g., antenna beam 681 and/or antenna beam 608 may each include multiple beams, and antenna beam 681 and/or antenna beam 608 may each include beams of different shapes than the circular spot beam as is shown in FIG. 6 (e.g., antenna beam 681 and/or antenna beam 608 may each include elliptical beams and/or shaped beams of various different shapes).

It should be noted that in one or more embodiments, the host payload antenna 682 and/or the hosted payload antenna 680 may each comprise one or more reflector dishes including, but not limited to, parabolic reflectors and/or shaped reflectors. In addition, the host payload antenna 682 and/or the hosted payload antenna 680 may each comprise one or more multifeed antenna arrays.

The host payload 606 transmits 609 unencrypted host telemetry (i.e. telemetry data related to the host payload 606 that is utilized by the host user) to the host communication security module 662. The host communication security module 662 then encrypts the unencrypted host telemetry utilizing the host COMSEC variety (i.e. COMESEC variety 1) to generate encrypted host telemetry.

Also, the hosted payload(s) 607 transmits 672 unencrypted hosted telemetry (i.e. telemetry data related to the hosted payload(s) 607 that is utilized by the hosted user(s)) to the hosted communication security modules 663. The hosted communication security modules 663 then encrypt the unencrypted hosted telemetry utilizing the hosted COMSEC varieties (i.e. COMSEC variety 2 to COMSEC variety N+1) to generate encrypted hosted telemetry. As such, for each hosted user 660, a different hosted COMSEC variety will be utilized for the encryption of the unencrypted hosted telemetry associated with that hosted user 660.

The host communication security module 662 then transmits 693 the encrypted host telemetry to a telemetry transmitter 694. The telemetry transmitter 694 then transmits 695 the encrypted host telemetry to a telemetry antenna 623. The telemetry antenna 623 then transmits 697 the encrypted host telemetry to the SOC antenna 616. The SOC antenna 616 then transmits 698 (via a terrestrial link with IPSec VPN) the encrypted host telemetry to the satellite operation portion 651 of the host SOC 650. The satellite operation portion 651 then decrypts the encrypted host telemetry utilizing the host COMSEC variety (i.e. COMSEC variety 1) to generate the unencrypted host telemetry.

The hosted communication security modules 663 also transmit 696 the encrypted hosted telemetry to the hosted payload 607. The hosted payload 607 then transmits the encrypted hosted telemetry to the hosted payload antenna 680. The hosted payload antenna 680 then transmits 638 the encrypted hosted telemetry to the host gateway antenna 627. The host gateway antenna 627 then transmits 639 (via a terrestrial link with IPSec VPN) the encrypted hosted telemetry to the satellite operation portion 651 of the host SOC 650.

The satellite operation portion 651 transmits 632 the encrypted hosted telemetry to the secure enclave 652 of the host SOC 650. The secure enclave 652 decrypts the encrypted hosted telemetry utilizing the hosted COMSEC varieties (e.g., COMSEC variety 2 to COMSEC variety N+1) to generate the unencrypted hosted telemetry. The secure enclave 652 then transmits 633 (via a terrestrial link with IPSec VPN) the unencrypted hosted telemetry respectively to the hosted users 660 that the unencrypted telemetry is associated.

FIGS. 7A, 7B, and 7C together show a flow chart for the disclosed method for commercial satellite operations with secure enclave for payload operations for the systems shown in FIGS. 4, 5, and 6, in accordance with at least one embodiment of the present disclosure. At the start 700 of the method, a secure enclave of a host satellite operation center (SOC) receives at least one request from at least one hosted user, where each of the requests comprises service specifications for the hosted user associated with the request 705. Then, the secure enclave generates unencrypted hosted commands for each of the requests according to the service specifications of the request 710. The secure enclave then encrypts the unencrypted hosted commands for each of the requests by utilizing a respective hosted communication security (COMSEC) variety for the hosted user associated with the request to produce encrypted hosted commands 715. A SOC operation portion of the host SOC generates unencrypted host commands according to service specifications for a host user 720. Then, the SOC operation portion encrypts unencrypted host commands by utilizing a host COMSEC variety to produce encrypted host commands 725. The host SOC then transmits the encrypted host commands and the encrypted hosted commands to a vehicle 730.

Then, a host communication security module on the vehicle decrypts the encrypted host commands by utilizing the host COMSEC variety to produce the unencrypted host commands 735. Also, a respective hosted communication security module on the vehicle for each of the hosted users decrypts the encrypted hosted commands for each of the hosted users by utilizing the respective hosted COMSEC variety to produce the unencrypted hosted commands 740. Then, a host payload on the vehicle is reconfigured according to the unencrypted host commands 745. Also, at least one hosted payload on the vehicle is commanded on or off according to the unencrypted host commands 750. In addition, at least one hosted payload is reconfigured according to the unencrypted hosted commands 755. Then, a host payload antenna on the vehicle transmits host user data to a host user antenna 760. Also, a hosted payload antenna on the vehicle transmits hosted user data to a hosted user antenna 765. Then, the host payload generates unencrypted host telemetry 770. Also, at least one hosted payload generates unencrypted hosted telemetry 775. The host communication security module then encrypts the unencrypted host telemetry by utilizing the host COMSEC variety to produce encrypted host telemetry 780. Also, the respective hosted communication security module for each of the hosted users encrypts the unencrypted hosted telemetry for each of the hosted users by utilizing the respective hosted COMSEC variety to produce the encrypted hosted telemetry 785.

Then, the vehicle transmits the encrypted host telemetry and the encrypted hosted telemetry to the host SOC 790. The SOC operation portion then decrypts the encrypted host telemetry by utilizing the host COMSEC variety to produce the unencrypted host telemetry 795. Also, the secure enclave decrypts the encrypted hosted telemetry for each of the hosted users by utilizing the respective hosted COMSEC variety to produce the unencrypted hosted telemetry for each of the hosted users 796. Then, the method ends 797.

FIG. 8 is a spreadsheet 800 showing the possible combinations for the transmission (i.e. transmitted either out-of-band or inband) of the host commanding, host telemetry, hosted commanding, and hosted telemetry for the disclosed system for commercial satellite operations with secure enclave for payload operations, in accordance with at least one embodiment of the present disclosure. In this figure, for a vehicle comprising a single host/hosted payload or a host payload and a hosted payload(s), the spreadsheet shows the possible frequency bands for transmission of the associated telemetry and command signals. For example, the combinations of the number (No.) 1 configuration indicate that all of the signals (i.e. host commanding, host telemetry, hosted commanding, and hosted telemetry) will be transmitted on out-of-band frequencies. For another example, the combinations of the number (No.) 4 configuration indicate that the host related signals (i.e. host commanding and host telemetry) will be transmitted on out-of-band frequencies, and the hosted related signals (i.e. hosted commanding and hosted telemetry) will be transmitted on inband frequencies.

As previously mentioned above, the host/hosted payload (i.e. shared payload), the host payload and/or at least one hosted payload for the disclosed system for private vehicle resource allocation and control may employ various different types of transponders. For example, various different types of transponders may be employed including, but not limited to, various different types of digital transponders, various different types of analog transponders (e.g., conventional repeater-type transponders), and various different types of combination analog/digital transponders. It should be noted that in one or more embodiments, when a payload (e.g., the host/hosted payload, host payload, and/or hosted payload) employs an analog transponder (e.g., conventional repeater-type transponder), the payload will utilize only out-of-band frequencies for the transmission of its associated telemetry signal and the receiving of the its associated command signals (i.e. the payload cannot be configured for the transmission of telemetry signals and the receiving of command signals utilizing inband frequencies).

Illustrative, non-exclusive examples of inventive subject matter according to the present disclosure are described in the following enumerated paragraphs:

A1. A method for payload operations, the method comprising:

receiving, by a secure enclave of a host satellite operation center (SOC), at least one request from at least one hosted user, wherein each of the requests comprises service specifications for the hosted user associated with the request;

generating, by the secure enclave, unencrypted hosted commands for each of the requests according to the service specifications of the request;

encrypting, by the secure enclave, the unencrypted hosted commands for each of the requests by utilizing a respective hosted communication security (COMSEC) variety for the hosted user associated with the request to produce encrypted hosted commands;

encrypting, by a SOC operation portion of the host SOC, unencrypted host commands by utilizing a host COMSEC variety to produce encrypted host commands;

transmitting, by the host SOC, the encrypted host commands and the encrypted hosted commands to a vehicle;

decrypting, by a host communication security module on the vehicle, the encrypted host commands by utilizing the host COMSEC variety to produce the unencrypted host commands;

decrypting, by a respective hosted communication security module on the vehicle for each of the hosted users, the encrypted hosted commands for each of the hosted users by utilizing the respective hosted COMSEC variety to produce the unencrypted hosted commands;

reconfiguring a host/hosted payload on the vehicle according to the unencrypted host commands and the unencrypted hosted commands;

generating, by the host/hosted payload, unencrypted host telemetry and unencrypted hosted telemetry;

encrypting, by the host communication security module, the unencrypted host telemetry by utilizing the host COMSEC variety to produce encrypted host telemetry;

encrypting, by the respective hosted communication security module for each of the hosted users, the unencrypted hosted telemetry for each of the hosted users by utilizing the respective hosted COMSEC variety to produce the encrypted hosted telemetry;

transmitting, by the vehicle, the encrypted host telemetry and the encrypted hosted telemetry to the host SOC;

decrypting, by the SOC operation portion, the encrypted host telemetry by utilizing the host COMSEC variety to produce the unencrypted host telemetry; and decrypting, by the secure enclave, the encrypted hosted telemetry for each of the hosted users by utilizing the respective hosted COMSEC variety to produce the unencrypted hosted telemetry for each of the hosted users.

A2. The method of paragraph A1, wherein the method further comprises generating, by the SOC operation portion, the unencrypted host commands according to service specifications for a host user.

A3. The method of paragraph A1, wherein the method further comprises transmitting, by a payload antenna on the vehicle, host user data to a host user antenna and hosted user data to a hosted user antenna.

A4. The method of paragraph A1, wherein the encrypted host commands are transmitted from the host SOC to the vehicle utilizing at least one of: at least one out-of-band frequency band or at least one inband frequency band.

A5. The method of paragraph A4, wherein when the encrypted host commands are transmitted utilizing the at least one out-of-band frequency band, the encrypted host commands are transmitted from the host SOC to the vehicle via a SOC antenna.

A6. The method of paragraph A4, wherein when the encrypted host commands are transmitted utilizing the at least one inband frequency band, the encrypted host commands are transmitted from the host SOC to the vehicle via a host gateway antenna.

A7. The method of paragraph A1, wherein the encrypted hosted commands are transmitted from the host SOC to the vehicle utilizing at least one of: at least one out-of-band frequency band or at least one inband frequency band.

A8. The method of paragraph A7, wherein when the encrypted hosted commands are transmitted utilizing the at least one out-of-band frequency band, the encrypted hosted commands are transmitted from the host SOC to the vehicle via a SOC antenna.

A9. The method of paragraph A7, wherein when the encrypted hosted commands are transmitted utilizing the at least one inband frequency band, the encrypted hosted commands are transmitted from the host SOC to the vehicle via a host gateway antenna.

A10. The method of paragraph A1, wherein the encrypted host telemetry is transmitted from the vehicle to the host SOC utilizing at least one of: at least one out-of-band frequency band or at least one inband frequency band.

A11. The method of paragraph A10, wherein when the encrypted host telemetry is transmitted utilizing the at least one out-of-band frequency band, the encrypted host telemetry transmitted from the vehicle to the host SOC via a SOC antenna.

A12. The method of paragraph A10, wherein when the encrypted host telemetry is transmitted utilizing the at least one inband frequency band, the encrypted host telemetry is transmitted from the vehicle to the host SOC via a host gateway antenna.

A13. The method of paragraph A1, wherein the encrypted hosted telemetry is transmitted from the vehicle to the host SOC utilizing at least one of: at least one out-of-band frequency band or at least one inband frequency band.

A14. The method of paragraph A13, wherein when the encrypted hosted telemetry is transmitted utilizing the at least one out-of-band frequency band, the encrypted hosted telemetry transmitted from the vehicle to the host SOC via a SOC antenna.

A15. The method of paragraph A13, wherein when the encrypted hosted telemetry is transmitted utilizing the at least one inband frequency band, the encrypted hosted telemetry is transmitted from the vehicle to the host SOC via a host gateway antenna.

A16. The method of paragraph A1, wherein the host/hosted payload is one of a digital payload or an analog payload.

A17. The method of paragraph A1, wherein the reconfiguring of the host/hosted payload comprises adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one of the at least one beam, transponder beamforming settings, effective isotropic radiation power (EIRP) for at least one of the at least one beam, transponder channels, or beam steering.

A18. The method of paragraph A1, wherein the reconfiguring of the host/hosted payload comprises reconfiguring at least one of: a payload antenna, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix.

A19. The method of paragraph A1, wherein the vehicle is one of a satellite, an aircraft, an unmanned aerial vehicle (UAV), or a space plane.

B1. A method for payload operations, the method comprising:

receiving, by a secure enclave of a host satellite operation center (SOC), at least one request from at least one hosted user, wherein each of the requests comprises service specifications for the hosted user associated with the request;

generating, by the secure enclave, unencrypted hosted commands for each of the requests according to the service specifications of the request;

encrypting, by the secure enclave, the unencrypted hosted commands for each of the requests by utilizing a respective hosted communication security (COMSEC) variety for the hosted user associated with the request to produce encrypted hosted commands;

encrypting, by a SOC operation portion of the host SOC, unencrypted host commands by utilizing a host COMSEC variety to produce encrypted host commands;

transmitting, by the host SOC, the encrypted host commands and the encrypted hosted commands to a vehicle;

decrypting, by a host communication security module on the vehicle, the encrypted host commands by utilizing the host COMSEC variety to produce the unencrypted host commands;

decrypting, by a respective hosted communication security module on the vehicle for each of the hosted users, the encrypted hosted commands for each of the hosted users by utilizing the respective hosted COMSEC variety to produce the unencrypted hosted commands;

reconfiguring a host payload on the vehicle according to the unencrypted host commands;

commanding at least one hosted payload on the vehicle one of on or off according to the unencrypted host commands;

reconfiguring the at least one hosted payload according to the unencrypted hosted commands;

generating, by the host payload, unencrypted host telemetry;

generating, by the at least one hosted payload, unencrypted hosted telemetry;

encrypting, by the host communication security module, the unencrypted host telemetry by utilizing the host COMSEC variety to produce encrypted host telemetry;

encrypting, by the respective hosted communication security module for each of the hosted users, the unencrypted hosted telemetry for each of the hosted users by utilizing the respective hosted COMSEC variety to produce the encrypted hosted telemetry;

transmitting, by the vehicle, the encrypted host telemetry and the encrypted hosted telemetry to the host SOC;

decrypting, by the SOC operation portion, the encrypted host telemetry by utilizing the host COMSEC variety to produce the unencrypted host telemetry; and decrypting, by the secure enclave, the encrypted hosted telemetry for each of the hosted users by utilizing the respective hosted COMSEC variety to produce the unencrypted hosted telemetry for each of the hosted users.

B2. The method of paragraph B1, wherein the method further comprises generating, by the SOC operation portion, the unencrypted host commands according to service specifications for a host user.

B3. The method of paragraph B1, wherein the method further comprises transmitting, by a host payload antenna on the vehicle, host user data to a host user antenna; and transmitting, by a hosted payload antenna on the vehicle, hosted user data to a hosted user antenna.

B4. The method of paragraph B3, wherein the host user antenna is one of a steerable reflector antenna or a phased array antenna, and the hosted user antenna is one of a steerable reflector antenna or a phased array antenna.

B5. The method of paragraph B1, wherein the encrypted host commands are transmitted from the host SOC to the vehicle utilizing at least one of: at least one out-of-band frequency band or at least one inband frequency band.

B6. The method of paragraph B5, wherein when the encrypted host commands are transmitted utilizing the at least one out-of-band frequency band, the encrypted host commands are transmitted from the host SOC to the vehicle via a SOC antenna.

B7. The method of paragraph B5, wherein when the encrypted host commands are transmitted utilizing the at least one inband frequency band, the encrypted host commands are transmitted from the host SOC to the vehicle via a host gateway antenna.

B8. The method of paragraph B1, wherein the encrypted hosted commands are transmitted from the host SOC to the vehicle utilizing at least one of: at least one out-of-band frequency band or at least one inband frequency band.

B9. The method of paragraph B8, wherein when the encrypted hosted commands are transmitted utilizing the at least one out-of-band frequency band, the encrypted hosted commands are transmitted from the host SOC to the vehicle via a SOC antenna.

B10. The method of paragraph B8, wherein when the encrypted hosted commands are transmitted utilizing the at least one inband frequency band, the encrypted hosted commands are transmitted from the host SOC to the vehicle via a host gateway antenna.

B11. The method of paragraph B1, wherein the encrypted host telemetry is transmitted from the vehicle to the host SOC utilizing at least one of: at least one out-of-band frequency band or at least one inband frequency band.

B12. The method of paragraph B11, wherein when the encrypted host telemetry is transmitted utilizing the at least one out-of-band frequency band, the encrypted host telemetry transmitted from the vehicle to the host SOC via a SOC antenna.

B13. The method of paragraph B11, wherein when the encrypted host telemetry is transmitted utilizing the at least one inband frequency band, the encrypted host telemetry is transmitted from the vehicle to the host SOC via a host gateway antenna.

B14. The method of paragraph B1, wherein the encrypted hosted telemetry is transmitted from the vehicle to the host SOC utilizing at least one of: at least one out-of-band frequency band or at least one inband frequency band.

B15. The method of paragraph B14, wherein when the encrypted hosted telemetry is transmitted utilizing the at least one out-of-band frequency band, the encrypted hosted telemetry transmitted from the vehicle to the host SOC via a SOC antenna.

B16. The method of paragraph B14, wherein when the encrypted hosted telemetry is transmitted utilizing the at least one inband frequency band, the encrypted hosted telemetry is transmitted from the vehicle to the host SOC via a host gateway antenna.

B17. The method of paragraph B1, wherein the host payload is one of a digital payload or an analog payload, and wherein the at least one hosted payload is one of a digital payload or an analog payload.

B18. The method of paragraph B1, wherein the reconfiguring of at least one of the host payload or the at least one hosted payload comprises adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one of the at least one beam, transponder beamforming settings, effective isotropic radiation power (EIRP) for at least one of the at least one beam, transponder channels, or beam steering.

B19. The method of paragraph B1, wherein the reconfiguring of at least one of the host payload or the at least one hosted payload comprises reconfiguring at least one of: a host payload antenna, a hosted payload antenna, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix.

B20. The method of paragraph B1, wherein the vehicle is one of a satellite, an aircraft, an unmanned aerial vehicle (UAV), or a space plane.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A system for payload operations, the system comprising:
   a secure enclave of a host satellite operation center (SOC) to receive at least one request from at least one hosted user, wherein each of the requests comprises service specifications for the hosted user associated with the request;
   the secure enclave to generate unencrypted hosted commands for each of the requests according to the service specifications of the request, and to encrypt the unencrypted hosted commands for each of the requests by utilizing a respective hosted communication security (COMSEC) variety for the hosted user associated with the request to produce encrypted hosted commands;
   a SOC operation portion of the host SOC to encrypt unencrypted host commands by utilizing a host COMSEC variety to produce encrypted host commands;
   the host SOC to transmit the encrypted host commands and the encrypted hosted commands to a vehicle;
   a host communication security module on the vehicle to decrypt the encrypted host commands by utilizing the host COMSEC variety to produce the unencrypted host commands; a respective hosted communication security module on the vehicle for each of the hosted users to decrypt the encrypted hosted commands for each of the hosted users by utilizing the respective hosted COMSEC variety to produce the unencrypted hosted commands;
   a host/hosted payload on the vehicle configured to be reconfigured according to the unencrypted host commands and the unencrypted hosted commands, and to generate unencrypted host telemetry and unencrypted hosted telemetry;
   the host communication security module to encrypt the unencrypted host telemetry by utilizing the host COMSEC variety to produce encrypted host telemetry;
   the respective hosted communication security module for each of the hosted users to encrypt the unencrypted hosted telemetry for each of the hosted users by utilizing the respective hosted COMSEC variety to produce the encrypted hosted telemetry;
   the vehicle to transmit the encrypted host telemetry and the encrypted hosted telemetry to the host SOC;
   the SOC operation portion to decrypt the encrypted host telemetry by utilizing the host COMSEC variety to produce the unencrypted host telemetry; and
   the secure enclave to decrypt the encrypted hosted telemetry for each of the hosted users by utilizing the respective hosted COMSEC variety to produce the unencrypted hosted telemetry for each of the hosted users.

2. The system of claim 1, wherein the encrypted host commands are transmitted from the host SOC to the vehicle utilizing at least one of: at least one out-of-band frequency band or at least one inband frequency band.

3. The system of claim 1, wherein the encrypted hosted commands are transmitted from the host SOC to the vehicle utilizing at least one of: at least one out-of-band frequency band or at least one inband frequency band.

4. The system of claim 1, wherein the encrypted host telemetry is transmitted from the vehicle to the host SOC utilizing at least one of: at least one out-of-band frequency band or at least one inband frequency band.

5. The system of claim 1, wherein the encrypted hosted telemetry is transmitted from the vehicle to the host SOC utilizing at least one of: at least one out-of-band frequency band or at least one inband frequency band.

6. The system of claim 1, wherein the host/hosted payload is one of a digital payload or an analog payload.

7. The system of claim 1, wherein the host/hosted payload is reconfigured by adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one of the at least one beam, transponder beamforming settings, effective isotropic radiation power (EIRP) for at least one of the at least one beam, transponder channels, or beam steering.

8. The system of claim 1, wherein the host/hosted payload is reconfigured by reconfiguring at least one of: a payload antenna, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix.

9. The system of claim 1, wherein the vehicle is one of a satellite, an aircraft, an unmanned aerial vehicle (UAV), or a space plane.

10. A system for payload operations, the system comprising:
    a secure enclave of a host satellite operation center (SOC) to receive at least one request from at least one hosted user, wherein each of the requests comprises service specifications for the hosted user associated with the request;
    the secure enclave to generate unencrypted hosted commands for each of the requests according to the service specifications of the request, and to encrypt the unencrypted hosted commands for each of the requests by utilizing a respective hosted communication security (COMSEC) variety for the hosted user associated with the request to produce encrypted hosted commands;
    a SOC operation portion of the host SOC to encrypt unencrypted host commands by utilizing a host COMSEC variety to produce encrypted host commands;
    the host SOC to transmit the encrypted host commands and the encrypted hosted commands to a vehicle;
    a host communication security module on the vehicle to decrypt the encrypted host commands by utilizing the host COMSEC variety to produce the unencrypted host commands;

a respective hosted communication security module on the vehicle for each of the hosted users to decrypt the encrypted hosted commands for each of the hosted users by utilizing the respective hosted COMSEC variety to produce the unencrypted hosted commands;

a host payload on the vehicle configured to be reconfigured according to the unencrypted host commands, and to generate unencrypted host telemetry;

at least one hosted payload on the vehicle configured to be commanded one of on or off according to the unencrypted host commands, to be reconfigured according to the unencrypted hosted commands, and to generate unencrypted hosted telemetry;

the host communication security module to encrypt the unencrypted host telemetry by utilizing the host COMSEC variety to produce encrypted host telemetry;

the respective hosted communication security module for each of the hosted users to encrypt the unencrypted hosted telemetry for each of the hosted users by utilizing the respective hosted COMSEC variety to produce the encrypted hosted telemetry;

the vehicle to transmit the encrypted host telemetry and the encrypted hosted telemetry to the host SOC;

the SOC operation portion to decrypt the encrypted host telemetry by utilizing the host COMSEC variety to produce the unencrypted host telemetry; and the secure enclave to decrypt the encrypted hosted telemetry for each of the hosted users by utilizing the respective hosted COMSEC variety to produce the unencrypted hosted telemetry for each of the hosted users.

11. The system of claim 10, wherein the encrypted host commands are transmitted from the host SOC to the vehicle utilizing at least one of: at least one out-of-band frequency band or at least one inband frequency band.

12. The system of claim 10, wherein the encrypted hosted commands are transmitted from the host SOC to the vehicle utilizing at least one of: at least one out-of-band frequency band or at least one inband frequency band.

13. The system of claim 10, wherein the encrypted host telemetry is transmitted from the vehicle to the host SOC utilizing at least one of: at least one out-of-band frequency band or at least one inband frequency band.

14. The system of claim 10, wherein the encrypted hosted telemetry is transmitted from the vehicle to the host SOC utilizing at least one of: at least one out-of-band frequency band or at least one inband frequency band.

15. The system of claim 10, wherein the host payload is one of a digital payload or an analog payload, and wherein the at least one hosted payload is one of a digital payload or an analog payload.

16. The system of claim 10, wherein at least one of the host payload or the at least one hosted payload is reconfigured by adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one of the at least one beam, transponder beamforming settings, effective isotropic radiation power (EIRP) for at least one of the at least one beam, transponder channels, or beam steering.

17. The system of claim 10, wherein at least one of the host payload or the at least one hosted payload is reconfigured by reconfiguring at least one of: a host payload antenna, a hosted payload antenna, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix.

18. The system of claim 10, wherein the vehicle is one of a satellite, an aircraft, an unmanned aerial vehicle (UAV), or a space plane.

* * * * *